United States Patent
Kang et al.

(10) Patent No.: US 9,491,343 B2
(45) Date of Patent: Nov. 8, 2016

(54) LENS DRIVING ASSEMBLY AND ELECTRONIC APPARATUS HAVING THE SAME

(71) Applicant: SAMSUNG ELECTRONICS CO., LTD., Suwon-si, Gyeonggi-do (KR)

(72) Inventors: Yoon-seok Kang, Seoul (KR); Soo-jung Kim, Jinju-si (KR); Ki-yun Jo, Anyang-si (KR); Seong-ho Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 14/592,302

(22) Filed: Jan. 8, 2015

(65) Prior Publication Data

US 2015/0253534 A1    Sep. 10, 2015

(30) Foreign Application Priority Data

Mar. 7, 2014 (KR) .................. 10-2014-0027432

(51) Int. Cl.
| | |
|---|---|
| *H04N 5/225* | (2006.01) |
| *G02B 7/14* | (2006.01) |
| *G03B 17/14* | (2006.01) |
| *G03B 17/12* | (2006.01) |
| *G02B 7/10* | (2006.01) |
| *H04N 5/232* | (2006.01) |

(52) U.S. Cl.
CPC ............ *H04N 5/2254* (2013.01); *G02B 7/102* (2013.01); *G02B 7/14* (2013.01); *G03B 17/12* (2013.01); *G03B 17/14* (2013.01); *H04N 5/23296* (2013.01)

(58) Field of Classification Search
None
See application file for complete search history.

(56) References Cited

U.S. PATENT DOCUMENTS

| | | |
|---|---|---|
| 4,887,107 A | 12/1989 | Nakamura et al. |
| 6,944,396 B2 | 9/2005 | Ito et al. |
| 7,885,020 B2 | 2/2011 | Sasaki |
| 8,000,042 B2 | 8/2011 | Nuno et al. |
| 2004/0190160 A1 | 9/2004 | Nishimura |
| 2006/0115250 A1 | 6/2006 | Nomura |
| 2007/0183764 A1* | 8/2007 | Imura .................. G03B 5/02 396/55 |
| 2008/0080853 A1* | 4/2008 | Tsurukawa ............ G02B 7/102 396/529 |
| 2008/0266674 A1* | 10/2008 | Huang .................. G02B 7/08 359/696 |

(Continued)

FOREIGN PATENT DOCUMENTS

| | | |
|---|---|---|
| JP | 11-326737 A | 11/1999 |
| JP | 2009-222875 A | 10/2009 |

(Continued)

OTHER PUBLICATIONS

PCT Search Report and Written Opinion issued for PCT/KR2015/000335 (Apr. 22, 2015).

*Primary Examiner* — Shahbaz Nazrul
(74) *Attorney, Agent, or Firm* — Drinker Biddle & Reath LLP

(57) ABSTRACT

A lens driving assembly includes a cam barrel having an opening in an outer circumferential surface thereof and that rotates around an optical axis, a front barrel accommodated in the cam barrel and that moves in an optical axis direction corresponding to rotation of the cam barrel, and a first lens group assembly that pivots between a home position that is deviated from the optical axis and an alignment position that is aligned with the optical axis, in which the first lens group assembly moves through the opening between the home position and the alignment position according to the rotation of the cam barrel and an elastic force.

18 Claims, 16 Drawing Sheets

(56) References Cited

U.S. PATENT DOCUMENTS

| | | | |
|---|---|---|---|
| 2009/0231732 A1* | 9/2009 | Sasaki | G02B 7/102 359/700 |
| 2009/0251799 A1 | 10/2009 | Sasaki | |
| 2011/0181967 A1* | 7/2011 | Wakamizu | G03B 17/04 359/817 |
| 2011/0273786 A1* | 11/2011 | Ooya | G02B 7/102 359/817 |
| 2013/0063617 A1 | 3/2013 | Miyakawa et al. | |
| 2013/0242174 A1* | 9/2013 | Lim | G03B 3/10 348/357 |
| 2015/0168683 A1* | 6/2015 | Terada | G02B 7/102 359/817 |

FOREIGN PATENT DOCUMENTS

| | | |
|---|---|---|
| JP | 5354318 B2 | 11/2013 |
| KR | 10-2005-0009087 A | 1/2005 |

\* cited by examiner

LENS DRIVING ASSEMBLY AND ELECTRONIC APPARATUS HAVING THE SAME

CROSS-REFERENCE TO RELATED PATENT APPLICATIONS

This application claims the priority benefit of Korean Patent Application No. 10-2014-0027432, filed on Mar. 7, 2014, in the Korean Intellectual Property Office, the disclosure of which is incorporated by reference herein in its entirety.

BACKGROUND

1. Field

The present disclosure relates to a lens driving assembly and an electronic apparatus having the lens driving assembly, and more particularly, to a lens driving assembly in which a first lens group assembly is rotated and aligned with an optical axis by an elastic force and the rotation of a cam barrel, and an electronic apparatus having the lens driving assembly.

2. Related Art

With developments in technology, functions of a photographing apparatus have become varied and complicated. Owing to developments in engineering technology, a subject at a close-up distance and a far distance may be photographed by using a close-up lens and a zoom lens without distortion. Also, the developments in technology have led to a decrease in the size and thickness of photographing apparatuses.

When power of a photographing apparatus is turned off, a plurality of lenses in use are accommodated in the inside of the photographing apparatus and separate parts are needed therefore. When separate parts are not used, a barrel is rotated and moved along an inclined groove formed in an outer circumferential surface of a fixed barrel. As a movement distance increases for high-magnification zooming, the diameter of a barrel and the capacity of a motor to transfer a driving force increase accordingly.

SUMMARY

One or more embodiments of the present disclosure include a lens driving assembly including a first lens group assembly that moves from a home position to an alignment position by an elastic force and the rotation of a cam barrel, and an electronic apparatus including the lens driving assembly.

One or more embodiments of the present disclosure include a lens driving assembly including a front barrel that has a linear motion toward an optical axis due to a guide bar and the rotation of a cam barrel, and an electronic apparatus having the lens driving assembly.

One or more embodiments include a lens driving assembly including a plurality of protrusions formed on a cam barrel and guiding a movement of the first lens group assembly corresponding to the rotation of the cam barrel, and an electronic apparatus having the lens driving assembly.

One or more embodiments include a lens driving assembly including a protrusion that restricts a movement of a first lens group assembly by contacting a side surface of the first lens group assembly while the cam barrel rotates, in part of the entire rotation section of a cam barrel, and an electronic apparatus having the lens driving assembly.

One or more embodiments include a lens driving assembly including a first lens group assembly that moves into an internal space formed by a front barrel that is moved by the rotation of a cam barrel, through an opening of the cam barrel, and an electronic apparatus having the lens driving assembly.

One or more embodiments include a lens driving assembly including a leaf spring that attenuates shocks and/or vibrations generated as a first lens group assembly arrives at an alignment position, and an electronic apparatus having the lens driving assembly.

According to a variety of embodiments, a lens driving assembly in which a first lens group assembly moves from a home position to an alignment position due to an elastic force and the rotation of a cam barrel, and an electronic apparatus having the lens driving assembly, are provided.

Additional embodiments will be set forth in part in the description which follows and, in part, will be apparent from the description, or may be learned by practice of the presented embodiments.

According to one or more embodiments, a lens driving assembly includes a cam barrel having an opening in an outer circumferential surface thereof and that rotates around an optical axis, a front barrel accommodated in the cam barrel and that moves in an optical axis direction corresponding to rotation of the cam barrel, and a first lens group assembly that pivots between a home position that is deviated from the optical axis and an alignment position that is aligned with the optical axis, in which the first lens group assembly moves through the opening between the home position and the alignment position according to the rotation of the cam barrel and an elastic force.

The cam barrel may include: a gear formed on the outer circumferential surface of the cam barrel and that receives the driving force from a driving module; a first guide groove formed in an inner circumferential surface of the cam barrel and that guides the front barrel corresponding to the rotation due to the driving force; and at least one protrusion that guides a movement of the first lens group assembly.

The at least one protrusion of the cam barrel may include a plurality of protrusions, and the plurality of protrusions selectively contact a side surface of the first lens group assembly that rotates, corresponding to the rotation of the cam barrel.

The gear may be formed at an angle larger than a rotational angle of the cam barrel.

The first guide groove may include a short first guide groove having a short length and a long first guide groove having a long length due to the opening.

When the front barrel is moved by the rotation of the cam barrel, the first lens group assembly may be moved through the opening into an inner space by the movement of the front barrel.

The front barrel may include a plurality of protrusions that are formed on an outer circumferential surface of the front barrel and guided by the first guide groove of the cam barrel, and a second lens group barrel may be accommodated in the front barrel.

The home position may be a position of the first lens group assembly in the electronic apparatus that is in a first state, and the alignment position may be a position of the electronic apparatus that is in a second state.

A movement of the first lens group assembly may be restricted by contact between the at least one protrusion of the cam barrel and a side surface of the first lens group assembly in a partial rotation section of an entire rotation section of the cam barrel.

The first lens group assembly may include a first side surface and a second side surface corresponding to contacts of a plurality of protrusions of the cam barrel, and at least one of the plurality of protrusions may be contacted to the first side surface and the second side surface.

A rotation angle of the cam barrel while the first lens group assembly is located at the home position may be larger than a rotation angle of the cam barrel while the first lens group assembly is moved from the home position to the alignment position.

The lens driving assembly may further include a lens base that accommodates the cam barrel. The lens base may include: an axis that is a center of rotation of the first lens group assembly; a lens base guide groove that guides a rotation of the first lens group assembly; a fixing protrusion inserted in a second guide groove that is formed in the outer circumferential surface of the cam barrel and that guides the rotation of the cam barrel; and a guide bar that guides a linear motion of the front barrel corresponding to the rotation of the cam barrel.

The lens base guide groove of the lens base may have a radius of curvature.

The lens base may further include an image sensor opening, and an image sensor may be aligned with the optical axis through the image sensor opening.

The lens base may further include a leaf spring, and when the first lens group assembly arrives at the alignment position, the leaf spring may contact a circumferential protrusion that is formed on the outer circumferential surface of the cam barrel so as to attenuate a generated vibration corresponding to the arrival of the first lens group assembly at the alignment position.

The lens driving assembly may further include a spring that provides the first lens group assembly with an elastic force in a direction to pivot the first lens group assembly to the alignment position. The spring may include a hook at at least one end of opposite ends of the spring.

According to one or more embodiments, a lens driving assembly includes a cam barrel having a plurality of protrusions and an opening in an outer circumferential surface thereof and that rotates around an optical axis, a front barrel accommodated in the cam barrel and having a linear motion in an optical axis direction corresponding to the rotation of the cam barrel, and a first lens group assembly that pivots between a home position that is deviated from the optical axis and an alignment position that is aligned with the optical axis, in which the first lens group assembly moves through the opening between the home position and the alignment position according to the rotation of the cam barrel and an elastic force, and one of the plurality of protrusions protrudes in a circumferential direction of the cam barrel and another of the plurality of protrusions protrudes in a radial direction of the cam barrel so as to selectively contact the first lens group assembly corresponding to the rotation of the cam barrel.

According to one or more embodiments, an electronic apparatus includes a lens driving assembly having a motor, and a control unit controlling driving of the motor, in which the lens driving assembly further includes a cam barrel having an opening and that rotates around an optical axis due to a driving force that is transferred from the motor, a front barrel accommodated in the cam barrel and that moves in an optical axis direction corresponding to the rotation of the cam barrel, and a first lens group assembly that pivots between a home position that is deviated from the optical axis and an alignment position that is aligned with the optical axis, in which the first lens group assembly moves through the opening between the home position and the alignment position according to the rotation of the cam barrel and an elastic force.

BRIEF DESCRIPTION OF THE DRAWINGS

These and/or other embodiments will become apparent and more readily appreciated from the following description of various embodiments, taken in conjunction with the accompanying drawings in which.

DETAILED DESCRIPTION

Figure 1:
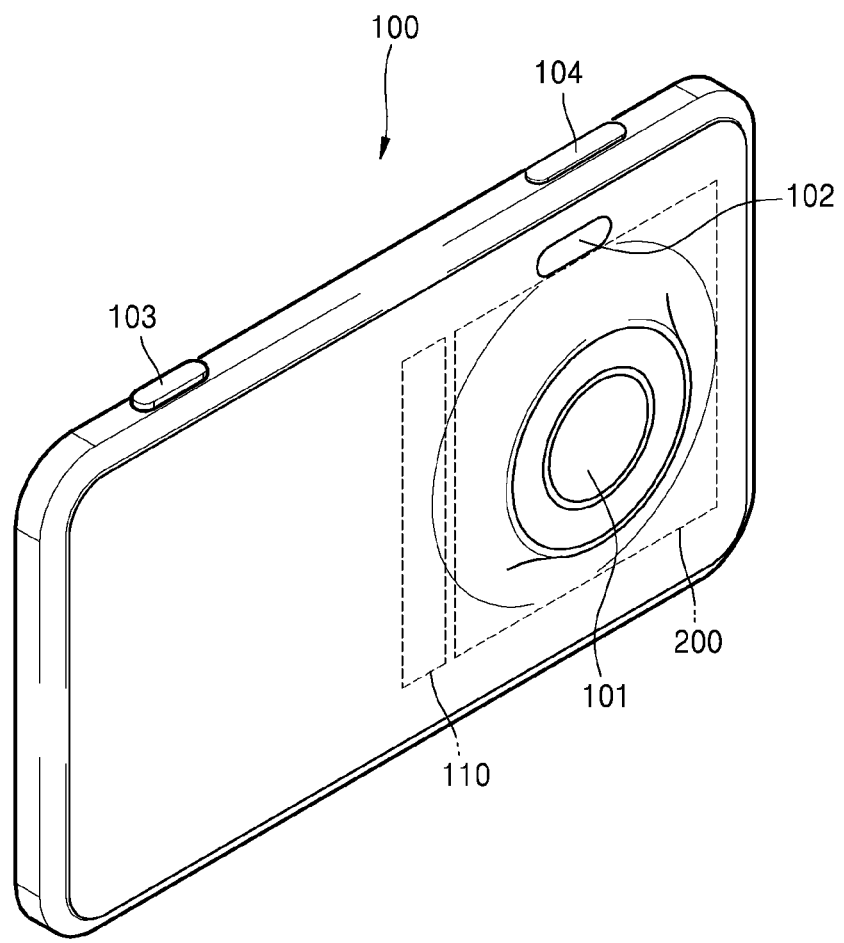
FIG. 1 is a perspective view schematically illustrating an electronic apparatus according to an embodiment.

Reference will now be made in detail to various embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain features of the present description. As used herein, the term "and/or" includes any and all combinations of one or more of the associated listed items. Expressions such as "at least one of," when preceding a list of elements, modify the entire list of elements and do not modify the individual elements of the list.

Terms such as "first" and "second" are used herein merely to describe a variety of constituent elements, but the constituent elements are not limited by the terms. Such terms are used only for the purpose of distinguishing one constituent element from another constituent element. For example, without departing from the scope of the invention, a first constituent element may be referred to as a second constituent element, and vice versa. Furthermore, recitation of ranges of values herein are merely intended to serve as a shorthand method of referring individually to each separate value falling within the range, unless otherwise indicated herein, and each separate value is incorporated into the specification as if it were individually recited herein.

Terms used in the present specification are used for explaining the various embodiments, and are not for limiting the invention. Thus, an expression used in a singular form in the present specification also includes the expression in its plural form unless clearly specified otherwise in context. No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise.

FIG. 1 is a perspective view schematically illustrating an electronic apparatus 100 such as a photographing apparatus, according to an embodiment.

Referring to FIG. 1, the electronic apparatus 100 may include a lens 101 and a flash 102 on a front surface thereof, and a display screen (not shown) and control buttons (not shown) for controlling functions of the electronic apparatus 100 on a rear surface thereof. The electronic apparatus 100 may include a shutter button 103, a power button 104, and a strap ring (not shown) on a side surface that connects the front surface and the rear surface. The buttons provided in the electronic apparatus 100 may be embodied not only by physical buttons but also by touch buttons. Also, the electronic apparatus 100 may include a control unit 110 that controls driving of the electronic apparatus 100 and a motor (not shown), and a battery (not shown) that supplies power to the electronic apparatus 100.

The electronic apparatus 100 may be included in a mobile phone, a smartphone, a tablet PC, a digital camera, a camcorder, a digital single-lens reflex camera, or a mirrorless camera. Also, the electronic apparatus 100 may include any other electronic apparatus (not shown) capable of capturing a still image and/or a moving image by using at least one lens or at least one lens group. The electronic apparatus 100 may be integrally formed with or separated from the electronic apparatus. For example, when the electronic apparatus 100 is a mobile or remotely operable type, the electronic apparatus 100 may be connected to the electronic apparatus in a wired/wireless manner and may transmit/receive captured and/or previously stored data, for example, a still image or a moving image, to/from the electronic apparatus 100.

The electronic apparatus 100 includes the control unit 110 and a lens driving assembly 200 that includes a plurality of lenses and/or a plurality of lens groups. Although it is not illustrated in detail in FIG. 1, the control unit 110 is electrically connected to constituent elements of the electronic apparatus 100 that includes the lens driving assembly 200. The control unit 110 may include a processor (not shown), read only memory (ROM) (not shown) where a control program for controlling the electronic apparatus 100 is stored, and random access memory (RAM) (not shown) where an external signal or data input outside the electronic apparatus 100 is stored or which is used as a storage area for various jobs or functions performed in the electronic apparatus 100. The control unit 110 may be embodied by one or more microchips or a circuit board including one or more microchips. The constituent elements included in the control unit 110 may be embodied by software, firmware, circuits, or a combination thereof that are included in or executed by the control unit 110.

The control unit 110 controls the overall operation of the electronic apparatus 100 and a flow of signals between the constituent elements of the electronic apparatus 100, and performs a function of processing data. Also, when conditions input by a user or set and stored conditions are met, the control unit 110 may execute an operating system (OS), various applications, or various functions.

Figure 2:
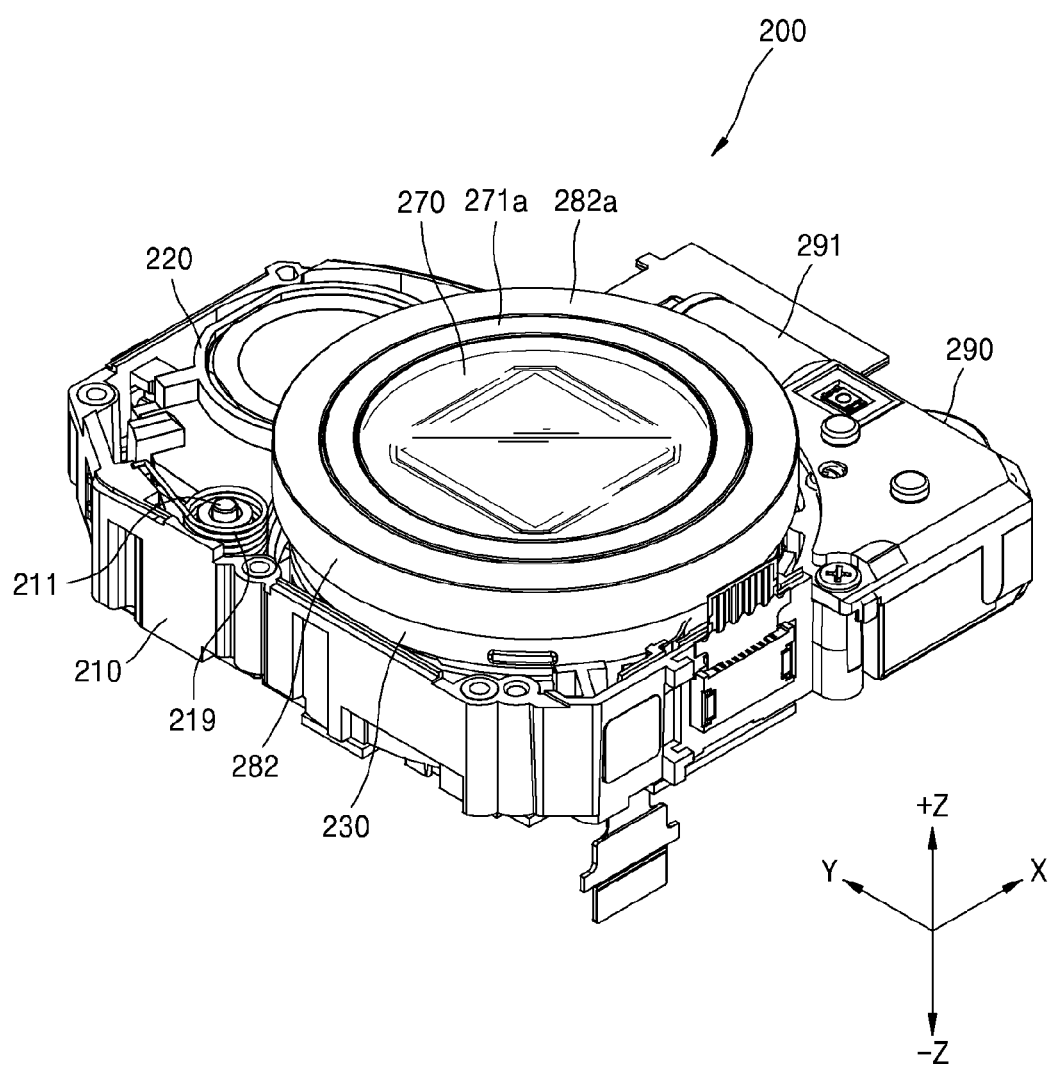
FIG. 2 is a perspective view schematically illustrating a lens driving assembly when a first lens group assembly is located at a home position in the electronic apparatus of FIG. 1.

FIG. 2 is a perspective view schematically illustrating the lens driving assembly 200 when a first lens group assembly 220 is located at a home position in the electronic apparatus 100 of FIG. 1.

In FIG. 2, the lens driving assembly 200 is illustrated as a perspective view from which a front cap 280 (see FIG. 4) has been partially removed. FIG. 2 is a schematic view of the lens driving assembly 200 including a first lens group assembly 220 that is located at a home position when the electronic apparatus 100 is in a first state, such as a power-off state or when a camera application (not shown), for example, a short-cut icon corresponding to the camera application, is not selected or activated in the electronic apparatus 100.

Referring to FIG. 2, the lens driving assembly 200 includes a lens base 210, the first lens group assembly 220, a cam barrel 230, a front barrel 240 (see FIG. 4), a second lens group assembly 250 (see FIG. 4), a shutter assembly 260 (see FIG. 4), a panel barrel 270, the front cap 280, and a driving module 290 including a motor 291 and a gear train (not shown). The lens driving assembly 200 may include an image senor module 295 (see FIG. 4) including an image sensor 296. The image sensor module 295 may be provided separately from or integrally with the lens driving assembly 200.

When the electronic apparatus 100 is in the first state, the front barrel 240, the second lens group assembly 250, the shutter assembly 260, and the panel barrel 270 are aligned with an optical axis, for example a z axis direction as shown in FIG. 2, and accommodated in the cam barrel 230.

The optical axis, for example the z axis of FIG. 2, with which the cam barrel 230, the front barrel 240, the second lens group barrel 250, the shutter assembly 260, and the panel barrel 270 are aligned, may correspond to a lens center axis with which the first lens group assembly 220, the second lens group barrel 250 and the image sensor 291 are aligned when the electronic apparatus 100 is in a second state.

When the electronic apparatus 100 is in the first state, the first lens group assembly 220 is located at the home position that is a position before the first lens group assembly 220 is moved to an alignment position with respect to an axis 211 that is fixed to the lens base 210. The home position is where the first lens group assembly 220 is deviated (e.g., separated) from the optical axis and is not involved in photographing by the electronic apparatus 100.

According to another embodiment, the electronic apparatus 100 may capture a still image and/or a moving image by using the second lens group barrel 250 and the image sensor 296 that are aligned with the optical axis, without using the first lens group assembly 220 that is located at the home position.

The alignment position of the first lens group assembly 220 corresponds to a position, for example, an optical requirement position, where the lens center axis, for example, the optical axis, of the first lens group assembly 220 that pivots on the axis 211 due to an elastic member, for example, an elastic force of a spring 219, and the lens center axis of the second lens group assembly 250 that has a linear motion are aligned with each other. The alignment position is where the first lens group assembly 220 is aligned with the optical axis of the image sensor 296 and is thus involved in the photographing by the electronic apparatus 100. The optical requirement position may correspond to a position where optical performances of the constituent elements of the lens driving assembly 200 are performed for capturing a still image and/or a moving image in the electronic apparatus 100.

The alignment position may include a position where an interval between the lens center axis of the first lens group assembly 220 and the lens center axis of the second lens group barrel 250 is less than or equal to about 2 millimeters (mm).

An inclination of the lens center axis of at least one of the first lens group assembly 220 and the second lens group barrel 250 may be identical to an inclination of the optical axis. Also, the lens center axis of at least one of the first lens group assembly 220 and the second lens group barrel 250 may be congruous with or parallel with the optical axis.

The height of a surface, for example, a surface 271a of a ring 271 crossing the optical axis, of the ring 271 of the panel barrel 270 among the constituent elements that are accommodated in the lens driving assembly 200 with respect to a bottom of the lens base 210 may be lower by, for example, about 0.01 to about 3 mm, than the height of a surface 282a, for example, a surface of a front cap ring 282 crossing the optical axis, of the front cap ring 282 with respect to a bottom of the lens base 210. Since the height of the surface 271 a of the ring 271 is lower than the surface 282a of the front cap ring 282, the heights of other accommodated elements, for example, the cam barrel 230, the front barrel 240, the second lens group barrel 250, and/or the shutter assembly 260, may be lower than the height of the front cap ring 282. When the ring 271 of the panel barrel 270 is accommodated to be lower than the front cap ring 282, various elements, for example, the cam barrel 230, the front barrel 240, the second lens group barrel 250, and the shutter assembly 260, may be protected from an external force applied not only in an optical axis direction but also in a direction crossing the optical axis.

Figure 3:
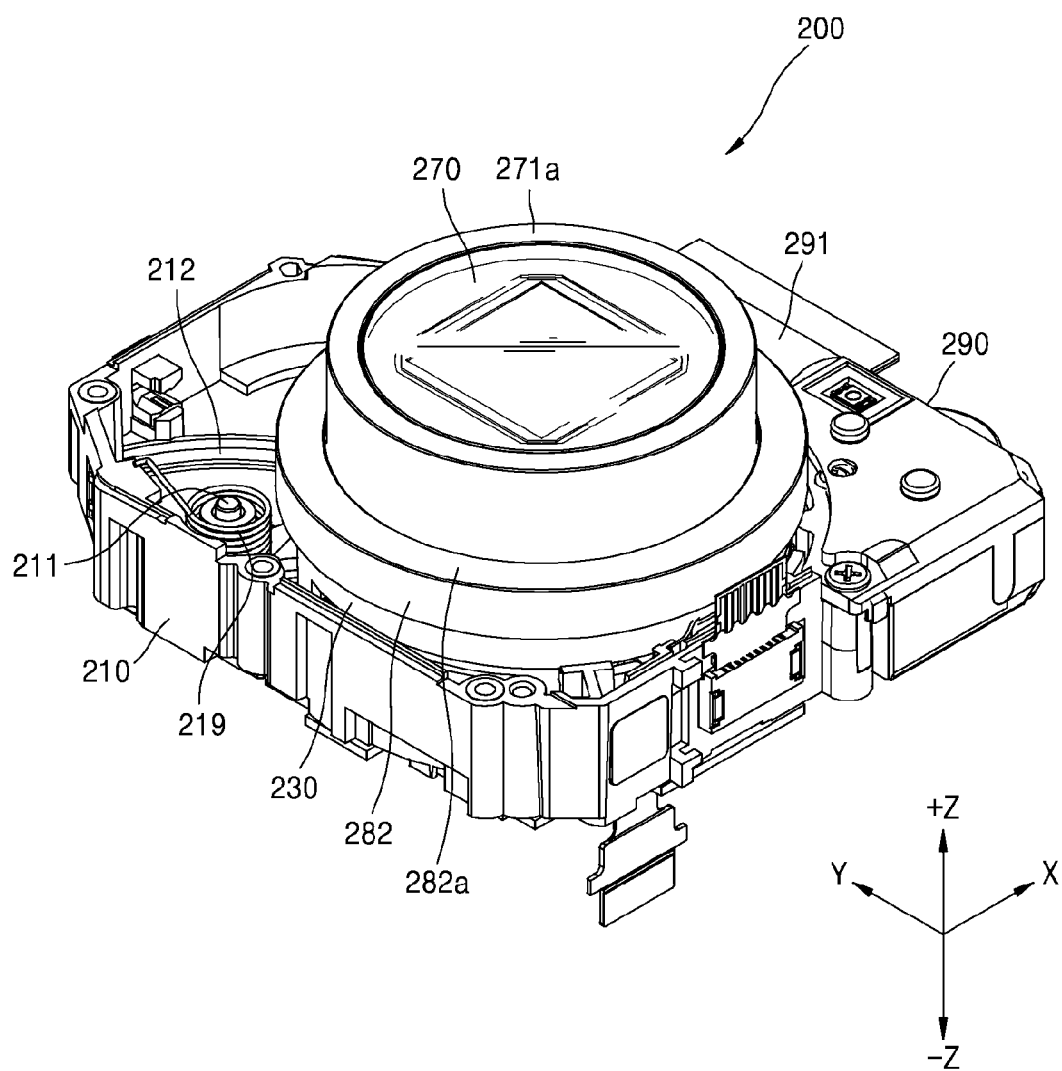
FIG. 3 is a perspective view schematically illustrating a lens driving assembly when the first lens group assembly is located at an alignment position in the electronic apparatus of FIG. 1.

FIG. 3 is a perspective view schematically illustrating the lens driving assembly 200 when the first lens group assembly 220 is located at an alignment position in the electronic apparatus 100 of FIG. 1.

In FIG. 3, similar to FIG. 2, the lens driving assembly 200 is illustrated to be a schematic perspective view in which the front cap 280 is partially removed. FIG. 3 is a schematic view of the lens driving assembly 200 that is located at the alignment position when the electronic apparatus 100 is in a second state, such as when the electronic apparatus 100 is booted and/or the camera application (not shown) is selected or activated in the electronic apparatus 100. FIG. 3 is a schematic view of the lens driving assembly 200 in which the first lens group assembly 220 and the second lens group barrel 250 are aligned with the optical axis (z axis) at the alignment position.

When the electronic apparatus 100 is in the second state, a driving force generated by the motor 291 of the driving module 290 is transferred through a gear train (not shown) of the driving module 290. The cam barrel 230 starts to rotate around the optical axis by the driving force transferred to a gear 234 of the cam barrel 230 through the gear train.

As the cam barrel 230 rotates, the front barrel 240, the second lens group barrel 250, the shutter assembly 260, and the panel barrel 270, which are accommodated inside the cam barrel 230, are moved in an optical axis direction (for example, +z direction). The first lens group assembly 220 pivots in a direction toward the optical axis through an opening 232 (see FIG. 4) of the cam barrel 230 by the elastic force of the spring 219. The first lens group assembly 220 that pivots is guided by a lens base guide groove 212 that is formed in the lens base 210. The first lens group assembly 220 may pivot by being guided by a first lens group guide protrusion 225 (see FIG. 8A) at a lower end of the first lens group assembly 220 and the lens base guide groove 212. The first lens group assembly 220 may pivot to the alignment position by the elastic force of the spring 219. The pivot of the first lens group assembly 220 may be completed within a predetermined time, for example, less than ±1.5 seconds, based on the completion of the rotation of the cam barrel 230.

In the following description, the operations of the first lens group assembly 220, the cam barrel 230, and/or the front barrel 240, which are at the home position and the alignment position, are described with reference to FIG. 4.

Figure 4:
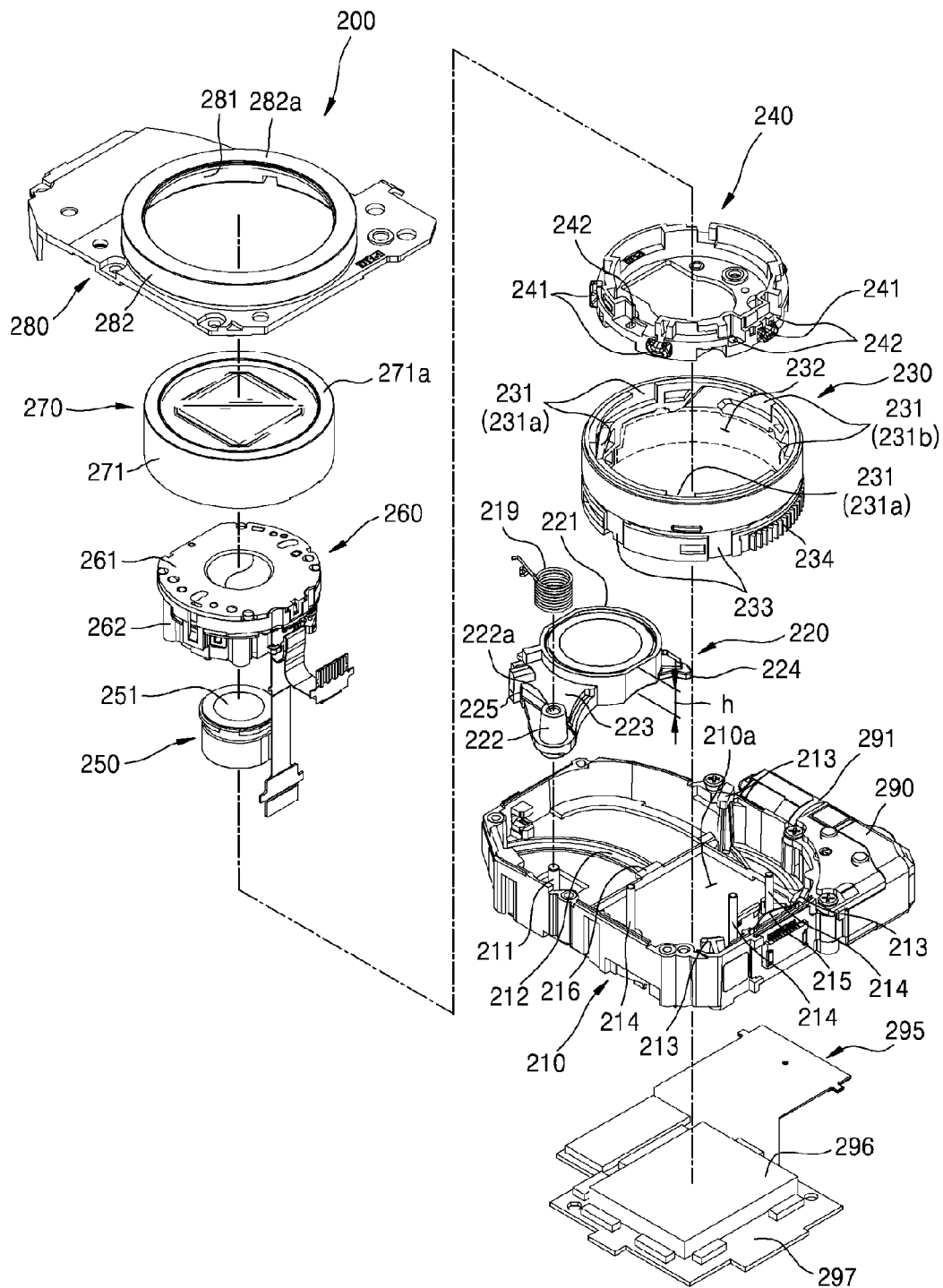
FIG. 4 is a perspective, exploded view schematically illustrating the lens driving assembly of the electronic apparatus of FIG. 1.

FIG. 4 is a perspective, exploded view schematically illustrating the lens driving assembly 200 of the electronic apparatus 100 of FIG. 1.

Referring to FIG. 4, the lens driving assembly 200 may include the lens base 210, the first lens group assembly 220, the cam barrel 230, the front barrel 240, the second lens group barrel 250, the shutter assembly 260, the panel barrel 270, the front cap 280, and the driving module 290 including the motor 291 and the gear train. The lens driving assembly 200 may include the image sensor module 295 that includes the image sensor 296.

The lens base 210 includes the axis 211, the lens base guide groove 212, a plurality of fixed protrusions 213, a plurality of guide bars 214, a leaf spring 215, a first stopper 216, a second stopper (not shown), and an image sensor opening 210a.

The axis 211 may be a reference axis of the elastic pivoting of the first lens group assembly 220. The position of the axis 211 may be determined based on the size of the lens driving assembly 200, the size of the cam barrel 230, for example, including an inner diameter and an outer diameter, and a movement distance and/or a rotation angle of the first lens group assembly 220. Referring to FIG. 6B, which is described below, the center of the axis 211 may be located inside a rectangular area 218 contacting the outer diameter of the cam barrel 230. When the center of the axis 211 is located inside the rectangular area 218 contacting the outer diameter of the cam barrel 230, compared to a case in which the center of the axis 211 is located outside the rectangular area 218 contacting the outer diameter of the cam barrel 230, the lens driving assembly 200 may be made compact and the movement distance of the first lens group assembly 220 may be reduced.

The spring 219 that provides an elastic force to the first lens group assembly 220 may be provided around an axis insertion column 222 through which the axis 211 penetrates. While a hook at one end of the spring 219 may contact a connection arm 223 of the first lens group assembly 220, a hook at the other end thereof may contact a side surface of the lens base 210.

The lens base guide groove 212 guides the first lens group assembly 220 that elastically pivots to the home position and the alignment position. The lens base guide groove 212 may have a radius of curvature selected to guide the first lens group assembly 220 to the home position and alignment position. The lens base guide groove 212 having a radius of curvature is advantageous in miniaturization of the lens driving assembly 200 compared to a linear lens base guide groove (not shown). Also, compared to the linear lens base guide groove, the lens base guide groove 212 having a radius of curvature may reduce at least one of a movement speed, shock, and vibration corresponding to arrival of the first lens group assembly 220 at the home position and the alignment position. For example, one of the movement speed, shock, or vibration, or a combination of the movement speed, shock, or vibration may be reduced. Also, the lens base guide groove 212 having a radius of curvature may attenuate a shock and/or vibration corresponding to the arrival of the first lens group assembly 220 from the alignment position to the home position, compared to the linear lens base guide groove. For example, one or more of the movement speed, shock, or vibration may be reduced.

The fixed protrusions 213 are inserted in a second guide groove 233 (see FIG. 6A) that is formed in an outer circumferential surface 233a of the cam barrel 230 to guide the rotation of the cam barrel 230. Also, the fixed protrusions 213 are inserted in the second guide groove 233 of the cam barrel 230 to guide the rotation and/or the movement of the cam barrel 230 in the direction toward the optical axis.

The guide bars 214 that are extended in the optical axis direction may guide the front barrel 240 located inside the cam barrel 230 to have a linear motion in the optical axis direction, for example, in the +z direction or −z direction, corresponding to the rotational motion of the cam barrel 230. A plurality of guide bar holes 242 for insertion of the guide bars 214 may be provided in the front barrel 240. The guide bars 214 may restrict the rotation of the front barrel 240 according to the rotational motion of the cam barrel 230. Also, as the front barrel 240 that has a linear motion along the guide bars 214 is applied to the electronic apparatus 100, the size of a lens barrel may be reduced.

The image sensor 296 may be aligned with the lens center axes of the first lens group assembly 220 and the second lens group barrel 250 through the image sensor opening 210a of the lens base 210. The size of the image sensor opening 210a may vary according to the size of the image sensor 296, for example, a horizontal length of the image sensor 296 by a vertical length of the image sensor 296.

When the first lens group assembly 220 arrives at the alignment position, the leaf spring 215 may attenuate shock and/or vibration generated due to the arrival of the first lens group assembly 220 at the alignment position.

When the first lens group assembly 220 arrives at the alignment position, a second stopper (not shown) may restrict the movement of a first lens group stopper 224 of the first lens group assembly 220.

The spring 219 provides an elastic force to the first lens group assembly 220 in a direction to pivot it toward the alignment position. The spring 219 may be a torsion spring. The spring 219 may be a torsion coil spring having a hook at one end only or at opposite ends.

The hook at one end of the spring 219 may be supported on the connection arm 223 of the first lens group assembly 220 and the hook at the other end may be supported on the lens base 210. Also, the spring 219 may be a tension coil spring having one end and the other end which are respectively supported on the lens base 210 and the connection arm 223 of the first lens group assembly 220. The first lens group assembly 220 may be moved from the home position to the alignment position through the opening 232 of the cam barrel 230 by the elastic force of the spring 219.

The first lens group assembly 220 may include a first lens group barrel 221, the axis insertion column 222, the connection arm 223 connecting the first lens group barrel 221 and the axis insertion column 222, a stopper 224, and the first lens group guide protrusion 225.

The first lens group barrel 221 may support one lens. Also, the first lens group barrel 221 may support two or more lenses and a lens seat arranged between the two or more lenses. It will be apparent to those of ordinary skill in the art that the number of lenses supported on the first lens group assembly 220 and/or the number of lens seats may vary in various embodiments.

The axis insertion column 222 may have a circular cylindrical shape or a circular cone shape including a through-hole 222a in which the axis 211 is inserted. The spring 219 may be disposed or inserted around the outer circumference of the axis insertion column 222.

The connection arm 223 connects the first lens group barrel 221 and the axis insertion column 222 to each other. The connection arm 223 may support the first lens group barrel 221.

The first lens group guide protrusion 225 at the lower end of the first lens group assembly 220 may guide the first lens group assembly 220 that is moved by the elastic force to the alignment position along the lens base guide groove 212. The first lens group guide protrusion 225 may restrict a movement of the first lens group assembly 220 guided by the lens base guide groove 212 in a horizontal direction, for example, in a direction crossing the optical axis.

The first lens group stopper 224 may extend from the first lens group barrel 221 in a radial direction. When the first lens group assembly 220 is aligned with the optical axis, the first lens group stopper 224 restricts the movement of the first lens group assembly 220 along the lens base guide groove 212. The first lens group stopper 224 may restrict the movement of the first lens group assembly 220 in the horizontal direction, for example, in the direction crossing the optical axis.

The cam barrel 230 that pivots includes a plurality of first guide grooves 231, the opening 232, the second guide groove 233, and a gear 234.

The cam barrel 230 is provided on the lens base 210 and is rotated around the optical axis by the driving force transferred through the motor 291 and the gear train. The size of a barrel may be reduced by decreasing the number of gear trains and/or the height of the gear train by using the cam barrel 230 that has a rotational motion only, compared to the cam barrel 230 that has both a rotational motion and a linear motion.

The first guide grooves 231 are formed in the inner circumferential surface of the cam barrel 230. The number of the first guide grooves 231 may be larger than or the same as the number of a plurality of protrusions 241 of the front barrel 240. For example, when the number of the first guide grooves 231 is 5, the number of the protrusions 241 of the front barrel 240 may be 5 or less than or equal to 4. The first guide grooves 231 are extended downwardly from the upper end of the cam barrel 230, extended in a circumferential direction, extended to be inclined downwardly, and then extended in a circumferential direction, in the stated order. For example, the first guide grooves 231 may have a shape such as that shown in FIGS. 4 and 5. The protrusions 241 of the front barrel 240 may be inserted in the upper ends of the first guide grooves 231. The first guide grooves 231 may be formed corresponding to the height of each of the protrusions 241 of the front barrel 240 or an area of each contact surface between the protrusions 241 and the first guide grooves 231.

The opening 232 is an area through which the first lens group barrel 221 that is moved by the elastic force from the spring 219 in the direction toward the optical axis passes. The opening 232 is formed in the lower end of the cam barrel 230. The height of the opening 232 according to the present embodiment is about 4.86 mm with respect to the lower end of the cam barrel 230. It is sufficient that the height of the opening 232 is set such that the first lens group assembly 220 may pass. An open angle of the opening 232 with respect to the optical axis in one embodiment is about 120°, for example, an angle between about 80° to 150°. Also, the first guide grooves 231 may include a short first guide groove 231*b* having a short length due to the opening 232 and a long first guide groove 231*a* having a long length due to not overlapping with the opening 232.

The second guide grooves 233 are formed on the outer circumferential surface of the cam barrel 230. The number of the second guide grooves 233 may be larger than or the same as the number of the fixed protrusions 213 of the lens base 210. For example, when the number of the second guide grooves 233 is 4, the number of the fixed protrusions 213 of the lens base 210 may be 4 or less than or equal to 3. The second guide grooves 233 may be extended upwardly from the lower end of the cam barrel 230 such that the fixed protrusions 213 of the lens base 210 may be inserted therein, and then extended in the circumferential direction. For example, the second guide grooves 233 may have a shape such as that shown in FIGS. 4, 5, 6A, and 7A. The thickness of each of the second guide grooves 233 may correspond to the height of each of the fixed protrusions 213 of the lens base 210 or the area of a contact surface between the fixed protrusions 213 and the second guide grooves 233.

The second guide grooves 233 may have different heights formed upwardly from the lower end of the cam barrel 230 corresponding to the height of each of the fixed protrusions 213. For example, the height of the second guide groove 233 formed adjacent to the opening 232 may be higher than the heights of the other second guide grooves 233.

The gear 234 may be formed on a partial area of the outer circumferential surface of the cam barrel 230. Also, the gear 234 may be formed in an area (e.g., where the opening 232 does not exist) of the outer circumferential surface of the cam barrel 230. The gear 234 formed on a partial area of the outer circumferential surface correspond to the rotation angle of the cam barrel 230. For example, when the rotation angle of the cam barrel 230 is about 50°, the gear 234 may be formed on the outer circumferential surface of the cam barrel 230 such that an angle between a start position and a final position of the gear 234 with respect to the optical axis exceeds about 50°.

The cam barrel 230 is rotated by the driving force that is transferred to the gear 234 via the motor 291 and the gear train. When the cam barrel 230 rotates, the first lens group assembly 220 that receives the elastic force may be moved from the home position to the alignment position by the elastic force of the spring 219 through the opening 232. When the cam barrel 230 rotates, the front barrel 240 that is accommodated in the cam barrel 230 may has a linear motion in the optical axis direction.

The front barrel 240 includes the protrusions 241 and the guide bar holes 242.

The protrusions 241 are guided by the first guide grooves 231 of the cam barrel 230 that rotates. The front barrel 240 has a linear motion in the optical axis direction (+z direction or −z direction) due to the rotation of the cam barrel 230 and the guide bars 214. When the first lens group assembly 220 is located at the home position, the front barrel 240 that is located inside the cam barrel 230 may be accommodated at a first position of the front barrel 240 that is adjacent to the image sensor 296. When the first lens group assembly 220 is moved from the home position to the alignment position due to the rotation of the cam barrel 230 and the elastic force, the front barrel 240 that is accommodated in the cam barrel 230 may be moved to a second position that is separated far from the image sensor 296, for example, in a linear motion in the optical axis direction (+z direction).

An interval between the first position and the second position of the front barrel 240, for example, a linear movement distance, may be greater than the height of the first lens group assembly 220. For example, when the height of the first lens group assembly 220 is about 4 mm, the interval between the first and second positions of the front barrel 240 may exceed 4 mm based on the thickness of the first lens group assembly 220. Also, the movement distance of each of the protrusions 241 that are guided by the first guide grooves 231 may be greater than the interval between the first and second positions of the front barrel 240. For example, when the height of the first lens group assembly 220 is about 4 mm, the movement distance of each of the protrusions 241 of the front barrel 240 may exceed about 4.1 mm. The movement distance of each of the protrusions 241 of the front barrel 240 may be changed not only by the height of the first lens group assembly 220 but also by the inner diameter of the cam barrel 230.

The guide bars 214 of the lens base 210 penetrate through the guide bar holes 242. The number of the guide bar holes 242 may vary according to the number of the guide bars 214 that are arranged on the lens base 210. The rotation of the front barrel 240 according to the rotation of the cam barrel 230 may be restricted by the guide bar holes 242 and the guide bars 214. Also, the front barrel 240 may accommodate the second lens group barrel 250.

The second lens group barrel 250 includes a plurality of lenses 251 and a plurality of lens seats (not shown).

The second lens group barrel 250 may support the lenses 251 and the lens seats. For example, the second lens group barrel 250 may support four (4) lenses and two (2) lens seats. The second lens group barrel 250 may be accommodated in the front barrel 240 that is located under the second lens group barrel 250. It will be apparent to those of ordinary skill in the art that the number of lenses and/or lens seats supported on the second lens group barrel 250 may vary in various embodiments.

The shutter assembly 260 may include a shutter module 261 and a voice coil motor (VCM) module 262. The shutter 261 may control a time period during which light may be input to the image sensor 296. Also, an aperture (not shown) may control the amount of light.

The VCM module 262 provides an auto focus function for adjusting a distance between the lenses 251 and the image sensor 296 by using a driving characteristic of a VCM. The VCM in an embodiment includes a spring, a coil, and a magnet and a lens, which may be moved in the optical axis direction by a current and a magnetic field.

The shutter assembly 260 and the second lens group barrel 250 are accommodated in the front barrel 240. The shutter assembly 260, the second lens group barrel 250, and the front barrel 240 may be coupled to one another. The second lens group barrel 250 is located in the middle and the shutter assembly 260 and the front barrel 240 may be coupled to each other by using a variety of coupling members (for example, a screw, a rivet, or a hook), an adhesive tape, or an adhesive agent.

The panel barrel 270 may include a panel barrel ring 271, glass, for example, transparent or semitransparent glass (not shown), a glass seat (not shown), and an infrared (IR) filter (not shown).

The panel barrel ring 271 may support the glass, for example, transparent or semitransparent glass (not shown), the glass seat, and the IR filter. The glass, the glass seat, and the IR filter are coupled to and supported on a front part of the panel barrel 270. The panel barrel 270 may be coupled to the shutter assembly 260 by using a variety of coupling members, for example, a screw, a rivet, a hook, an adhesive tape, or an adhesive agent.

The front cap 280 includes a front cap ring 281 and a front cap shield (not shown). The front cap ring 281 is coupled to a front cap shield and the front cap 280. The front cap 280 may be coupled to the lens base 210. The front cap 280 and the lens base 210 may be coupled by using a variety of coupling members (for example, a screw, a rivet, or a hook), an adhesive tape, or an adhesive agent.

The driving module 290 may include the motor 291 and the gear train (not shown) having a plurality of gears.

The driving force of the motor 291 that is activated under the control of the control unit 110 is transferred to the gear 234 of the cam barrel 230 via the gear train. The rotation direction, for example, a clockwise direction or a counterclockwise direction, of the cam barrel 230 is determined corresponding to the rotation direction of the motor 291 that is determined under the control of the control unit 110. Also, a linear motion direction, for example, the +z direction or the −z direction, of the front barrel 240 is determined corresponding to the rotation direction of the motor 291 that is determined under the control of the control unit. The rotation speed of the motor 291 may be constant or not constant. It will be apparent to those of ordinary skill in the art that the rotation speed of the motor 291 may be constant or not constant.

The driving module 290 may be coupled to the lens base 210 by using a variety of coupling members (for example, a screw, a rivet, or a hook), an adhesive tape, or an adhesive agent.

The image sensor module 295 may include the image sensor 296 and a printed circuit board (PCB) 297.

The image sensor 296 includes a semiconductor device that converts input light to an electric signal. The size of the image sensor 296 may be, for example, about 1/2.3" to about 4/3" with respect to the diagonal length of an image sensor. Also, the image sensor 296 may be, for example, a charge coupled device (CCD) image sensor. Also, the image sensor 296 may include a complementary metal-oxide semiconductor (CMOS) image sensor.

The PCB 297 may connect the image sensor 296 and a semiconductor device needed for driving the image sensor. Also, the control unit 110 and the image sensor 296 may be connected to each other via the PCB 297 and the control unit 110 may control the image sensor 296. The image sensor module 295 may be coupled to the lens base 210 by using a variety of coupling members, for example, a screw, a rivet, a hook, an adhesive tape, or an adhesive agent.

The lens driving assembly 200 may be located close to one of opposite side surfaces of the electronic apparatus 100, rather than a center area of the electronic apparatus 100. Also the lens driving assembly 200 may be located in a center area between a center point of the electronic apparatus 100 and one of the opposite side surfaces.

The electronic apparatus 100 according to the present embodiment may perform an optical function, for example, photographing, in one (1) step, and also, perform a zoom function by protruding in two (2) steps to five (5) steps by using a separate lens group barrel (not shown) that moves with respect to the optical axis (+z direction or −z direction). Also, the lens driving assembly 200 may be detachable with respect to the electronic apparatus 100 for use with a lens exchange method.

Figure 5:
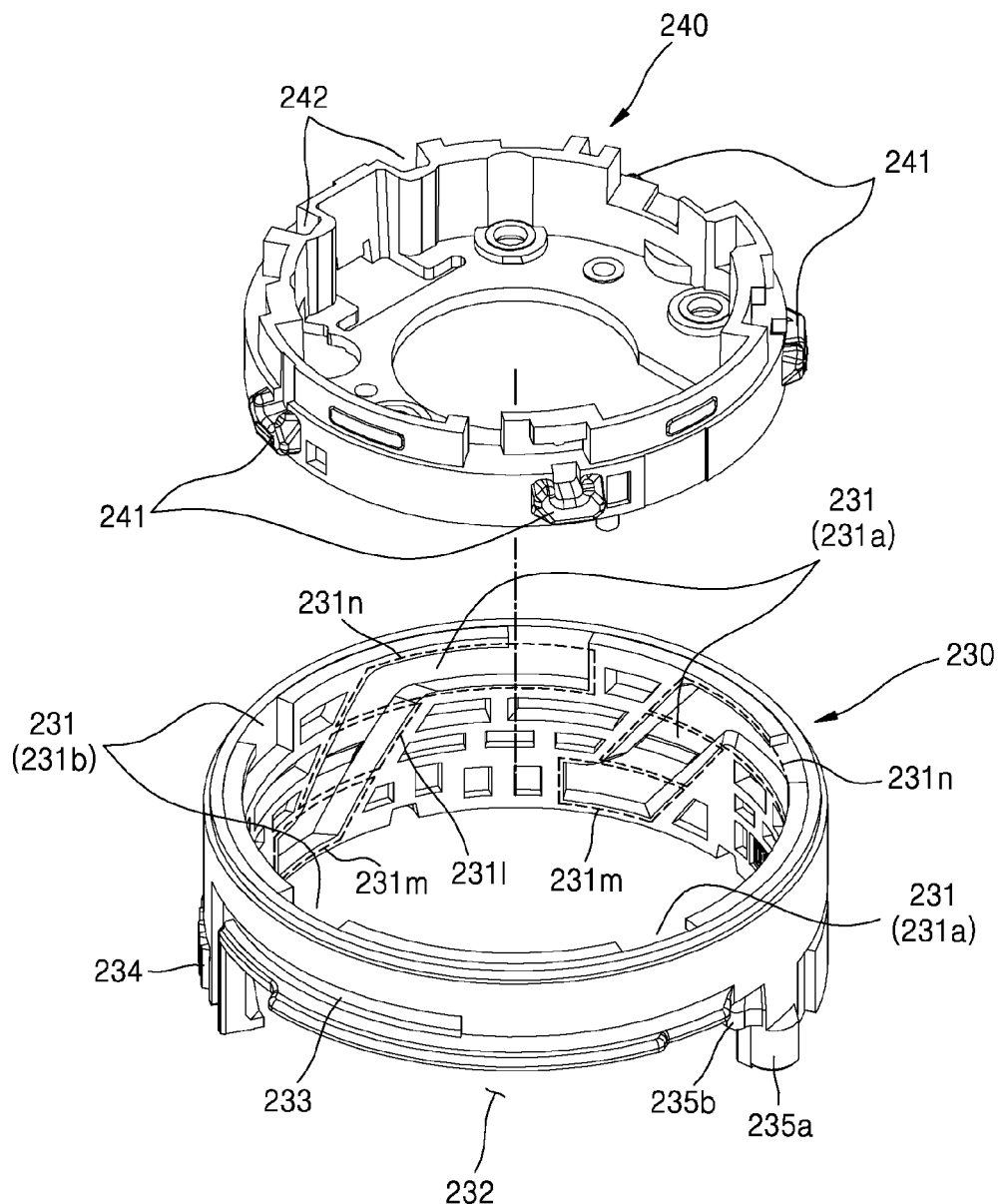
FIG. 5 is a perspective, exploded view schematically illustrating a front barrel and a cam barrel in the lens driving assembly of the electronic apparatus of FIG. 1.

FIG. 5 is a perspective view schematically illustrating the front barrel 240 and the cam barrel 230 in the lens driving assembly 200 of the electronic apparatus 100 of FIG. 1.

Referring to FIG. 5, the front barrel 240 that is located inside the cam barrel 230 is schematically illustrated separated from the cam barrel 230 in an exploded view.

The cam barrel 230 includes the first guide grooves 231, the opening 232, the second guide grooves 233, the gear 234, a first protrusion 235a, and a second protrusion 235b. The front barrel 240 includes the protrusions 241 and the guide bar holes 242. Each of the first guide grooves 231 of the cam barrel 230 includes a lower end area 231m, an upper end area 231n, and a connection area 231l that connects the lower end area 231m and the upper end area 231n.

In the first state of the electronic apparatus 100, each of the protrusions 241 of the front barrel 240 is located in the lower end area 231m of each of the first guide grooves 231 of the cam barrel 230, for example, a first position.

When the electronic apparatus 100 is changed from the first state to the second state, each of the protrusions 241 of the front barrel 240 may move from the lower end area 231m to the connection area 231l of each of the first guide grooves 231.

When the first lens group assembly 220 and the second lens group barrel 250 are aligned with the optical axis (for example, the z axis direction), for example, when the first lens group assembly 220 arrives at the alignment position, the protrusions 241 of the front barrel 240 may be located in the upper end area 231n or the connection area 231l. In some embodiments, some of the first guide grooves 231 do not have a part of the lower end area 231m or a part of the connection area 231l due to the opening 232 of the cam barrel 230. For example, the first guide groove 231b may include the upper end area 231n and a part of the connection area 231l. The first guide groove 231b may include only the upper end area 231n and the connection area 231l. The first guide groove 231b may include the upper end area 231n, the connection area 231l, and a part of the lower end area 231m.

The second guide grooves 233 may be formed in an arc shape having a length longer than the length of an arc corresponding to the rotation angle of the cam barrel 230, for example, a length of an arc from a rotation start position of the cam barrel 230 to a rotation end position of the cam barrel 230. The second guide grooves 233 guide the fixed protrusions 213 of the lens base 210 corresponding to the rotation of the cam barrel 230.

The first protrusion 235a and the second protrusion 235b may selectively contact a side surface of the connection arm 223 of the first lens group assembly 220, to which the elastic force is transferred, corresponding to the rotation of the cam barrel 230. For example, both the first protrusion 235a and the second protrusion 235b may contact the side surface of the connection arm 223 of the first lens group assembly 220 at a first rotation point. Only one of the first protrusion 235a and the second protrusion 235b may contact the side surface of the connection arm 223 of the first lens group assembly 220 at a second rotation point. Also, neither of the first protrusion 235a and the second protrusion 235b may contact the side surface of the connection arm 223 of the first lens group assembly 220 at a third rotation point. Alternative configurations will be apparent to those skilled in the art.

The selective contact between the first and second protrusions 235a and 235b and the connection arm 223 of the first lens group assembly 220 may reduce at least one of the movement speed, shock, or vibration corresponding to the arrival of the first lens group assembly 220 from the home position to the alignment position. For example, the movement speed, shock, or vibration, or a combination of the movement speed, shock, or vibration, may be reduced. Also, at least one of the movement speed, shock, or vibration corresponding to the arrival of the first lens group assembly 220 from the alignment position to the home position may be reduced. For example, the movement speed, shock, or vibration, or a combination of the movement speed, shock, or vibration, may be reduced.

Figure 6A:
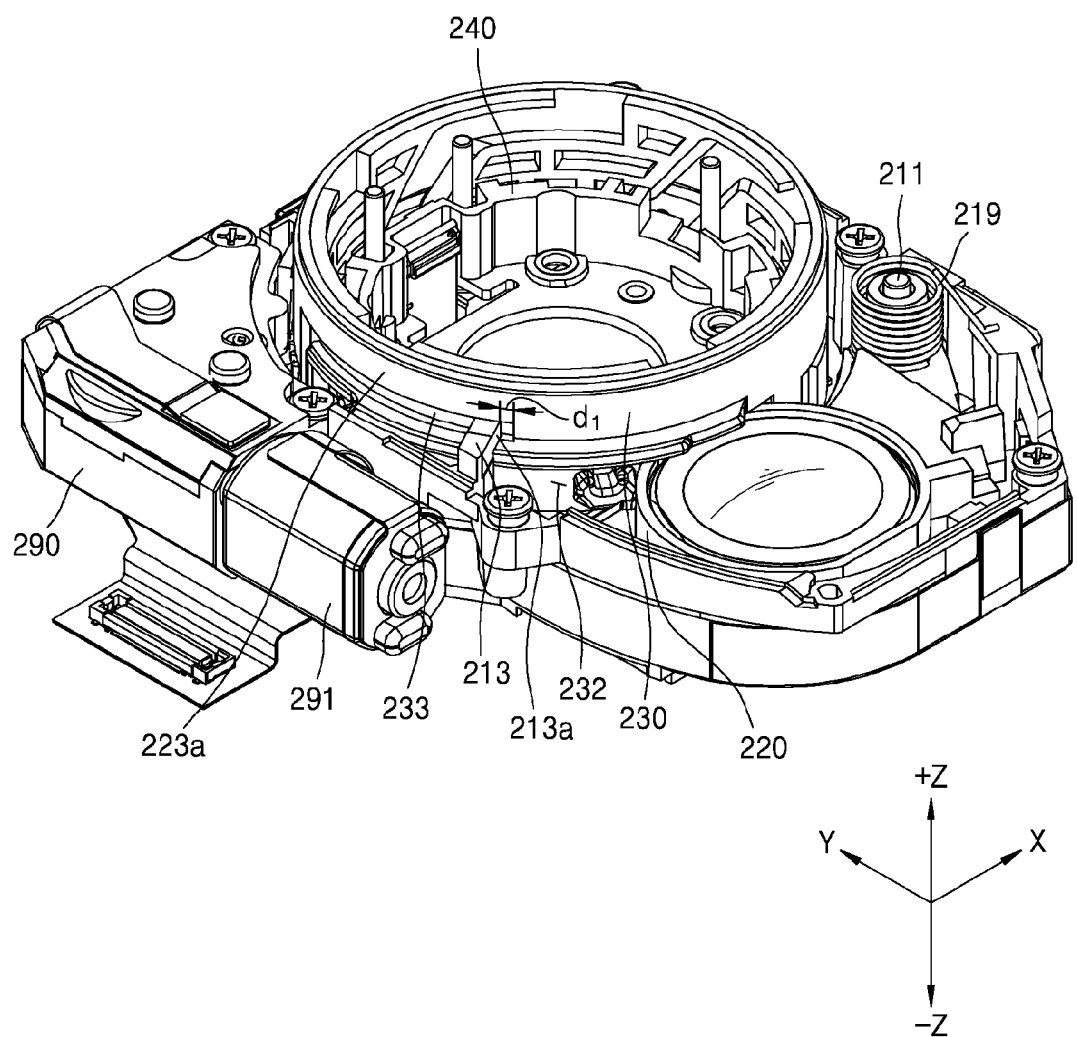
FIGS. 6A and 6B respectively are a perspective view and a front view schematically illustrating the lens driving assembly of the electronic apparatus of FIG. 1 in which the first lens group assembly is located at a home position.
Figure 6B:
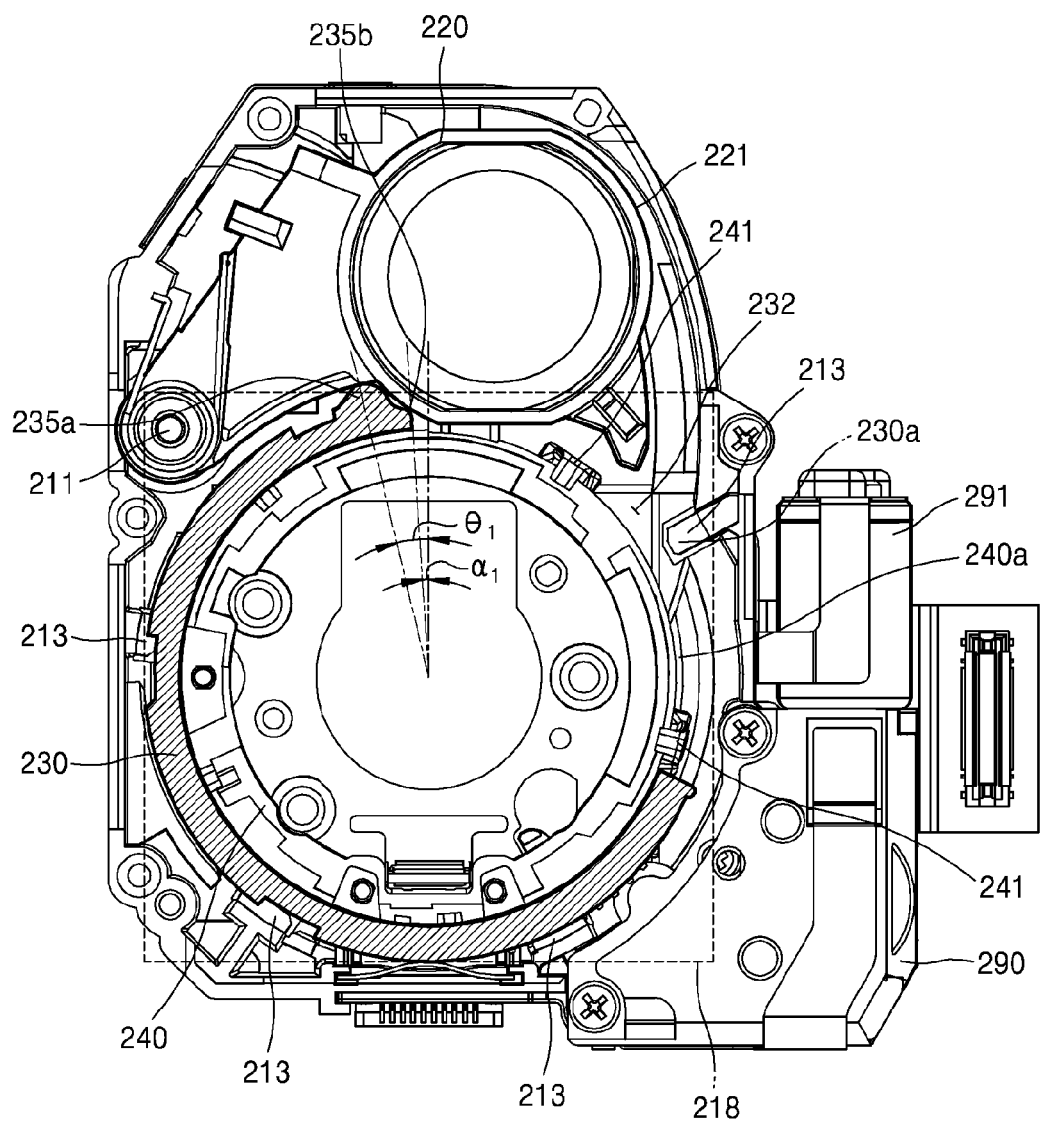

FIGS. 6A and 6B respectively are a perspective view and a front view schematically illustrating the lens driving assembly 200 of the electronic apparatus 100 of FIG. 1 in which the first lens group assembly 220 is located at the home position.

Referring to FIGS. 6A and 6B, the first lens group assembly 220 is located at the home position. The position of the front barrel 240 that is accommodated in the cam barrel 230 is a first position that is adjacent to the image sensor 296. The protrusions 241 of the front barrel 240 are located in the lower end areas 231m of the first guide grooves 231 of the cam barrel 230. Some of the protrusions 241 of the front barrel 240 may be exposed through the opening 232.

The fixed protrusions 213 of the lens base 210 are located in the second guide grooves 233 of the cam barrel 230. One of opposite ends of each of the second guide grooves 233 may be separated from one side surface 213a of each of the fixed protrusions 213 of the lens base 210 by a distance d1, that is, d1=approximately 0.95 mm. The distance d1 may be, for example, approximately 0.1 to 1.5 mm. It will be apparent to those of ordinary skill in the art that the distance d1 between the one end of each of the second guide grooves 233 and the one side surface 213a of each of the fixed protrusions 213 may vary according to the diameter of the cam barrel 230 in various embodiments.

When the one end of each of the second guide grooves 233 and the one side surface 213a of each of the fixed protrusions 213 is separated by the distance d1, the elements of the lens driving assembly 200 may prevent a gear backlash and/or damage due to the driving force of the motor 291 that drives beyond the alignment position of the first lens group assembly 220.

Referring to FIG. 6B, at the home position of the first lens group assembly 220, a partial area of the first lens group barrel 221 overlaps with a partial area of an outer circumferential surface 230a, for example, including an imaginary line, of the cam barrel 230. The partial area of the first lens group barrel 221 and the partial area of the outer circumferential surface 230a of the cam barrel 230 overlap with each other in the opening 232 of the cam barrel 230. Since the partial area of the first lens group barrel 221 and the partial area of the outer circumferential surface 230a of the cam barrel 230 overlap with each other, the movement distance of the first lens group assembly 220 may be reduced. The size of the lens driving assembly 200 may be reduced as well.

An outer circumferential surface of the first lens group barrel 221 may not contact an outer circumferential surface 240a, for example, including an imaginary line, of the front barrel 240. The outer circumferential surface of the first lens group barrel 221 may be separated a non-interference distance, for example, 0.05 mm or more, from the outer circumferential surface of the front barrel 240 that has a linear motion corresponding to the rotation of the cam barrel 230.

When the first lens group assembly 220 is located at the home position, only the first protrusion 235a may contact the side surface of the connection arm 223 of the first lens group assembly 220. Both the first protrusion 235a and the second protrusion 235b may contact the side surface of the connection arm 223 of the first lens group assembly 220. Also, only the second protrusion 235b may contact the side surface of the first lens group barrel 221.

When the first lens group assembly 220 is at the home position, an angle $\theta_1$ of the first protrusion 235a is about 14.4° and may be, for example, an angle between 11° to 18°. An angle $\alpha_1$ of the second protrusion 235b is about 9.6° and may be, for example, an angle between 6° to 13°.

As the outer circumferential surface of the first lens group barrel 221 is located between the outer circumferential surface 230a of the cam barrel 230 and the outer circumferential surface 240a of the front barrel 240, the sizes of the lens base 210 and the front cap 280 of the lens driving assembly 200 of the electronic apparatus 100 may be reduced. Since a weak elastic force corresponding to the decrease in the movement distance of the first lens group assembly 220 and a difference in the movement distance of the first lens group assembly 220 is applied to the spring 219, the manufacturing costs of the electronic apparatus 100 may be reduced. Also, the amount of electrical power consumption from a battery (not shown) of the electronic apparatus 100 may be reduced by the decrease in the operation time of the motor 291.

Figure 7A:
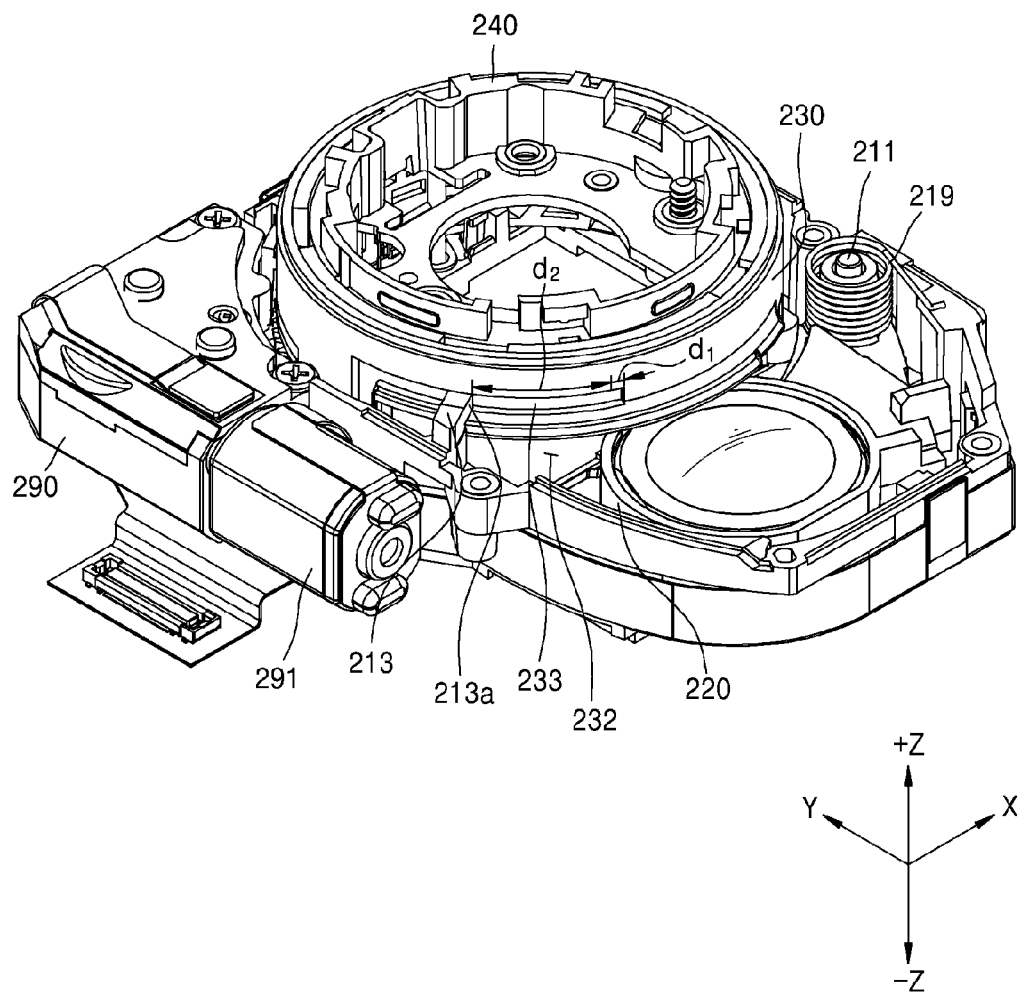
FIGS. 7A and 7B respectively are a perspective view and a front view schematically illustrating the lens driving assembly of the electronic apparatus of FIG. 1 in which the first lens group assembly is located at the home position and the cam barrel is rotated.
Figure 7B:
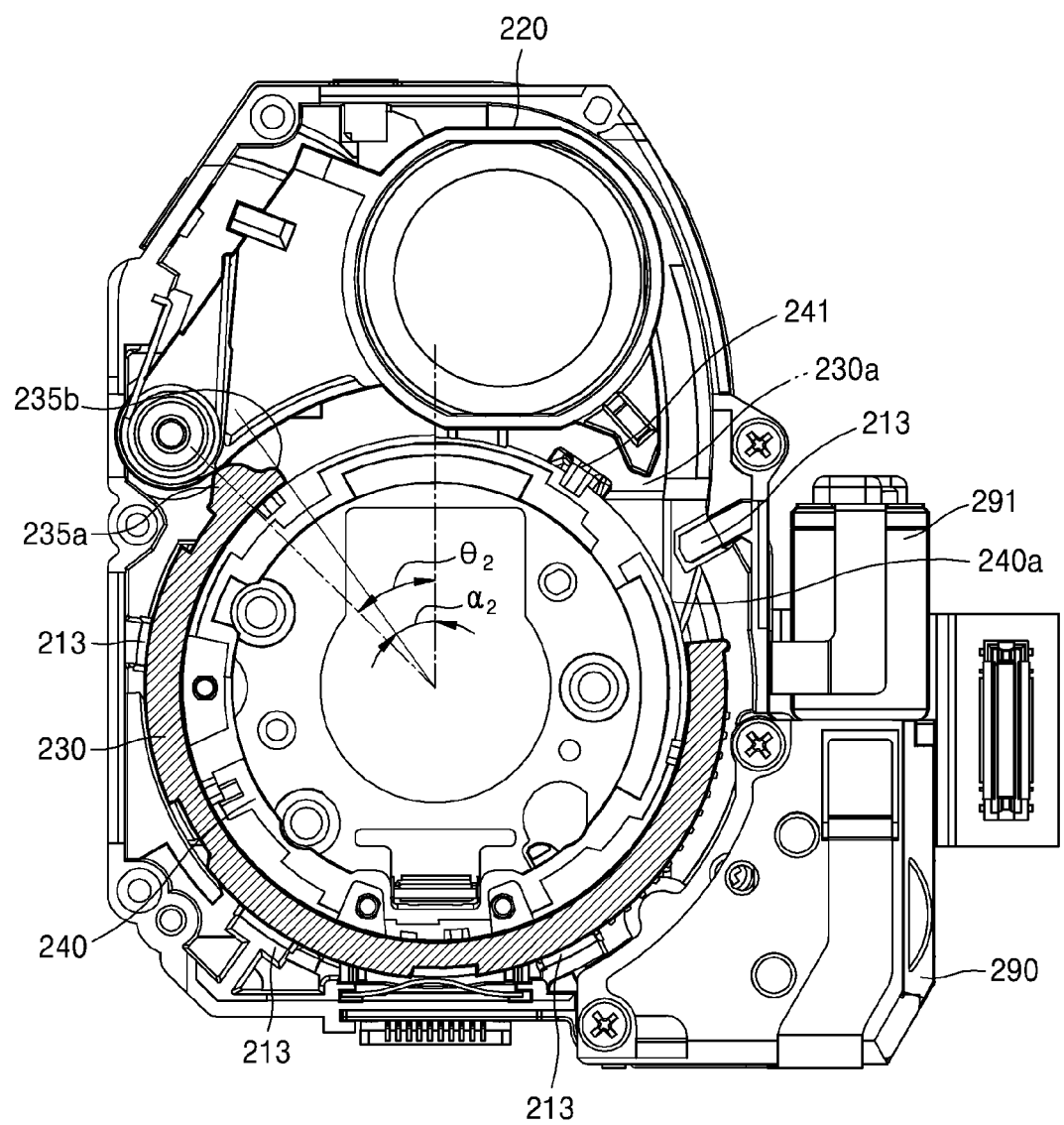

FIGS. 7A and 7B respectively are a perspective view and a front view schematically illustrating the lens driving assembly 200 of the electronic apparatus 100 of FIG. 1 in which the first lens group assembly 220 is located at the home position and the cam barrel 230 is rotated.

Referring to FIGS. 7A and 7B, although the cam barrel 230 rotates at an angle $\theta_2$, for example, about 44.4°, the first lens group assembly 220 is still located at the home position. Also, the angle $\theta_2$ may be, for example, between 41° to 48°.

The front barrel 240 that is accommodated in the cam barrel 230 is moving from the first position that is adjacent to the image sensor 296 to the second position. Each of the protrusions 241 of the front barrel 240 is located in a boundary area between the connection area 231l and the upper end area 231n of each of the first guide grooves 231. Also, each of the protrusions 241 of the front barrel 240 may be located in the connection area 231l of each of the first guide grooves 231. Also, each of the protrusions 241 of the front barrel 240 may be located in the upper end area 231n after passing through the connection area 231l of each of the first guide grooves 231.

The fixed protrusions 213 of the lens base 210 are respectively located in the second guide grooves 233 of the cam barrel 230. One of the opposite ends of each of the second guide grooves 233 may be separated by a distance, that is, d1+d2=8.15 mm, from the one side surface 213a of each of the fixed protrusions 213 of the lens base 210. The distance d1+d2 may be, for example, about 5 to 11 mm. The distance d2 is about 7.6 mm and is larger than the other distances d1, d3 (see FIG. 8A), and d4 (see FIG. 9A). It will be apparent to those of ordinary skill in the art that the distance d1+d2 between the one end of each of the second guide grooves 233 and the one side surface 213a of each of the fixed protrusions 213 may vary according to the diameter of the cam barrel 230.

Referring to FIG. 7B, at the home position of the first lens group assembly 220, most of an area of the first lens group assembly 220, for example, the first lens group barrel 221 and a part of the connection arm 223, faces the opening 232 of the cam barrel 230.

The outer circumferential surface of the first lens group barrel 221 may not contact the outer circumferential surface 240a, for example, including an imaginary line, of the front barrel 240. The outer circumferential surface of the first lens group barrel 221 may be separated by a non-interference distance, for example, 0.05 mm or more, from the outer circumferential surface 240a of the front barrel 240 that has a linear motion corresponding to the rotation of the cam barrel 230.

When the cam barrel 230 rotates and the first lens group assembly 220 is not moved, the front barrel 240 is moved in the optical axis direction (for example, +z direction). The movement height of the front barrel 240 in the optical axis direction (for example, the +z direction) may be greater than the height h (see FIG. 4) of the first lens group assembly 220. For example, when the height of the first lens group assembly 220 is about 4 mm, the movement distance of the front barrel 240 in the optical axis direction (+z direction) may exceed about 4 mm. When the movement height of the front barrel 240 in the optical axis direction (+z direction) is about 4 mm, the movement distance of the front barrel 240 along the first guide grooves 231 may not exceed about 4.1 mm. The movement distance of each of the protrusions 241 of the front barrel 240 may vary according to not only the height of the first lens group assembly 220 but also the inner diameter of the cam barrel 230.

When the cam barrel 230 rotates counterclockwise, the first protrusion 235a, of the first protrusion 235a and the second protrusion 235b, may contact a first side surface 223a (see FIG. 11) of the connection arm 223 of the first lens group assembly 220. The first protrusion 235a restricts the start of a movement of the first lens group assembly 220 at the home position toward the alignment position.

When the cam barrel 230 rotates and the first lens group assembly 220 is located at the home position, the angle $\theta_2$ of the first protrusion 235a is about 44.4°, for example, an angle between about 41° to 48°. An angle $\alpha_2$ of the second protrusion 235b is about 34.8°, for example, an angle between about 31° to 38°.

It will be apparent to those of ordinary skill in the art that the angle $\theta_2$ may vary according to at least one of a radius of curvature of the side surface, for example, the first side surface 223a, of the connection arm 223 of the first lens group assembly 220 that contacts the first protrusion 235a, the position of the axis 211 of the lens base 210, and the angle of the opening 232 of the cam barrel 230, for example, an angle between a start position and an end position of the opening 232.

Figure 8A:
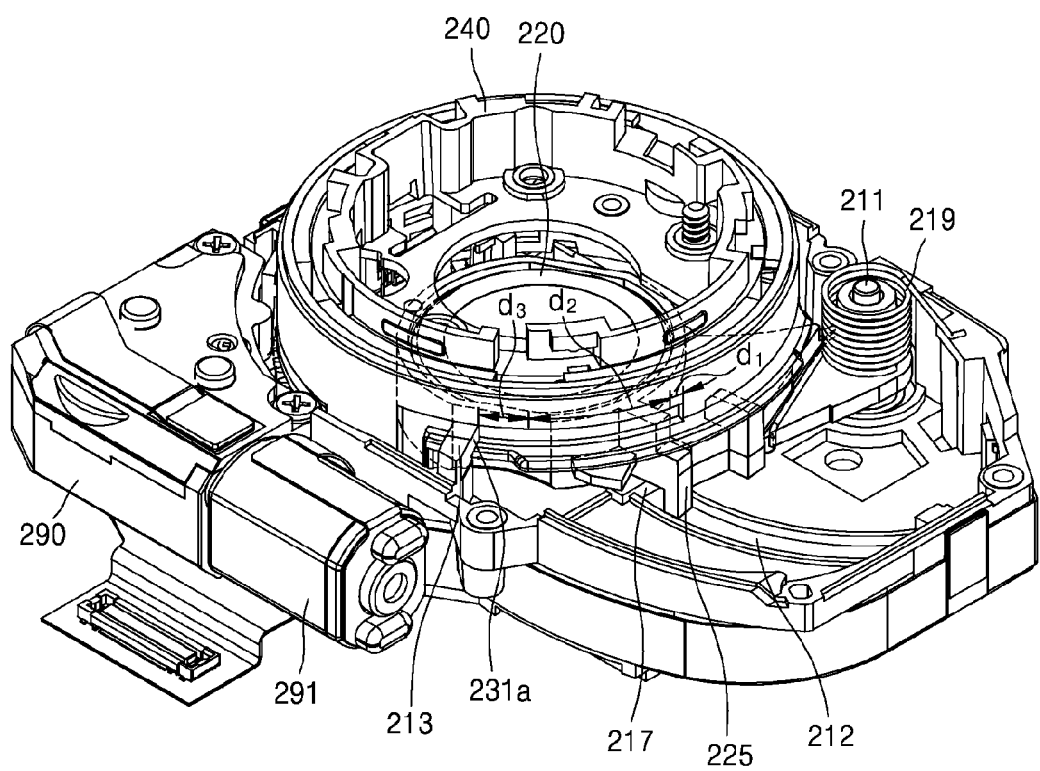
FIGS. 8A and 8B respectively are a perspective view and a front view schematically illustrating the lens driving assembly of the electronic apparatus of FIG. 1 in which the first lens group assembly is moved from the home position to the alignment position.
Figure 8B:
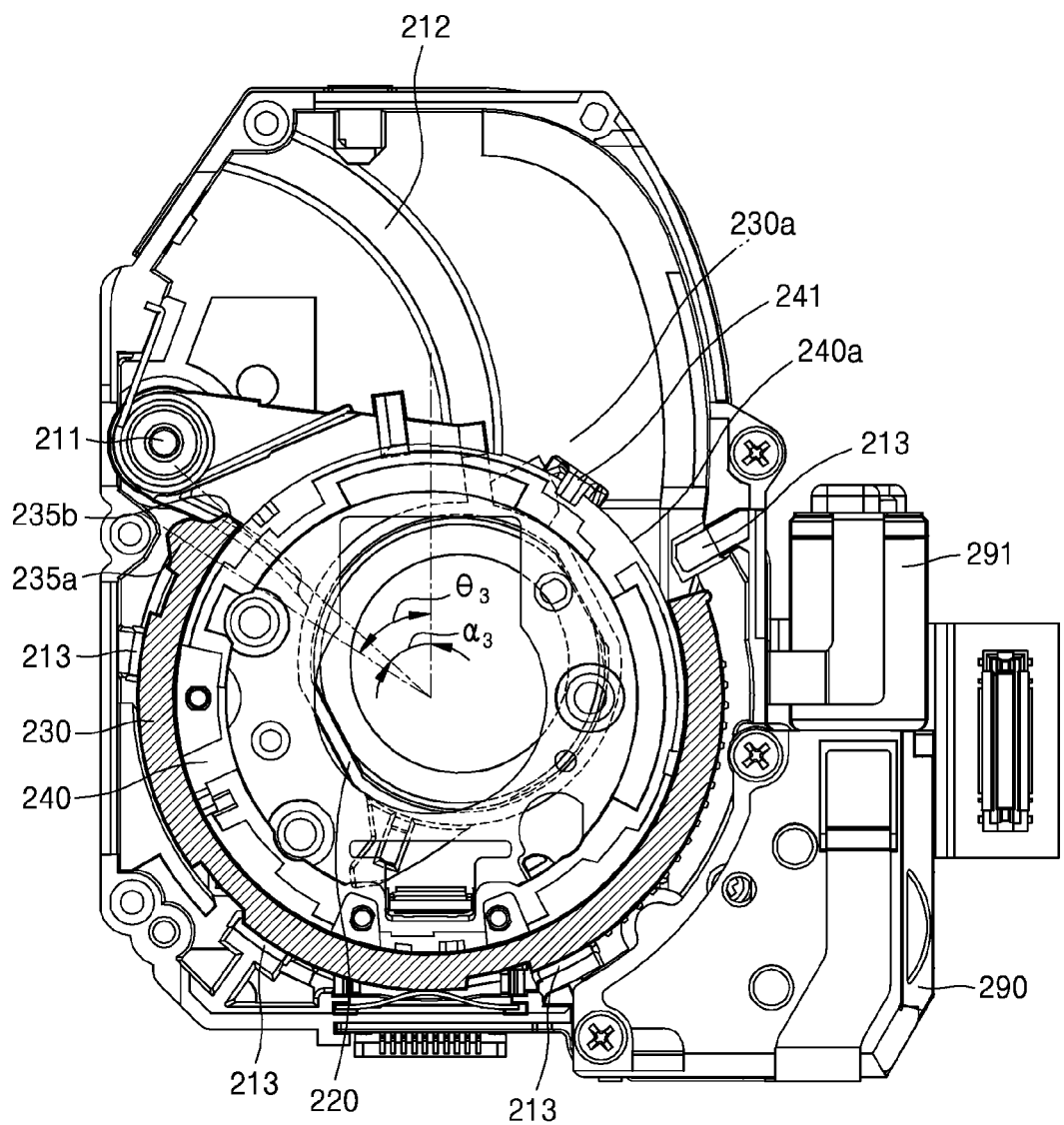

FIGS. 8A and 8B respectively are a perspective view and a front view schematically illustrating the lens driving assembly 200 of the electronic apparatus 100 of FIG. 1 in which the first lens group assembly 220 is moved from the home position to the alignment position.

When the cam barrel 230 continues to rotate, for example, the angle $\theta_2$ exceeds 44.4°, the first lens group assembly 220 starts to move from the home position to the alignment position.

Referring to FIGS. 8A and 8B, the cam barrel 230 continuously rotates and the first lens group assembly 220 is moving to the alignment position.

The position of the front barrel 240 may be the second position of the front barrel 240. The protrusions 241 of the front barrel 240 may be located in the upper end area 231n of each of the first guide grooves 231. Also, the protrusions 241 of the front barrel 240 may horizontally move over the upper end area 231n of each of the first guide grooves 231.

The fixed protrusions 213 of the lens base 210 are located in the second guide grooves 233 of the cam barrel 230. As the cam barrel 230 rotates, one end of the opposite ends of each of the second guide grooves 233 may be separated by a distance, that is, d1+d2+d3=11.22 mm, from the one side surface 213a of each of the fixed protrusions 213 of the lens base 210. Also, the distance d1+d2+d3 may be, for example, about 8 to 14 mm. The distances d1 and d3 may be shorter than the distance d2.

When the cam barrel 230 continues to rotate, the first lens group assembly 220 is moved by the elastic force of the spring 219 in the direction toward the optical axis with respect to the axis 211. In this time, the front barrel 240 does not further move in the optical axis direction (for example, the +z direction) and maintains the second position. The first lens group assembly 220 is moved (e.g., slides) into a space between the lens base 210 or the cam barrel 230 and the bottom of the front barrel 240, which is provided by the movement of the front barrel 240 in the optical axis direction (for example, the +z direction). It will be apparent to those of ordinary skill in the art that the movement distance of the front barrel 240 in the upper end area 231n of each of the first guide grooves 231 may vary according to at least one of the diameter and the rotation angle of the cam barrel 230.

The first lens group guide protrusion 225 of the first lens group assembly 220 and the first stopper 216 of the lens base 210 are separated from each other, for example, they do not contact each other. The guide protrusion 225 may restrict vibration of the first lens group assembly 220 in the optical axis direction (z axis direction) and guide the first lens group assembly 220 to move horizontally.

Figure 10:
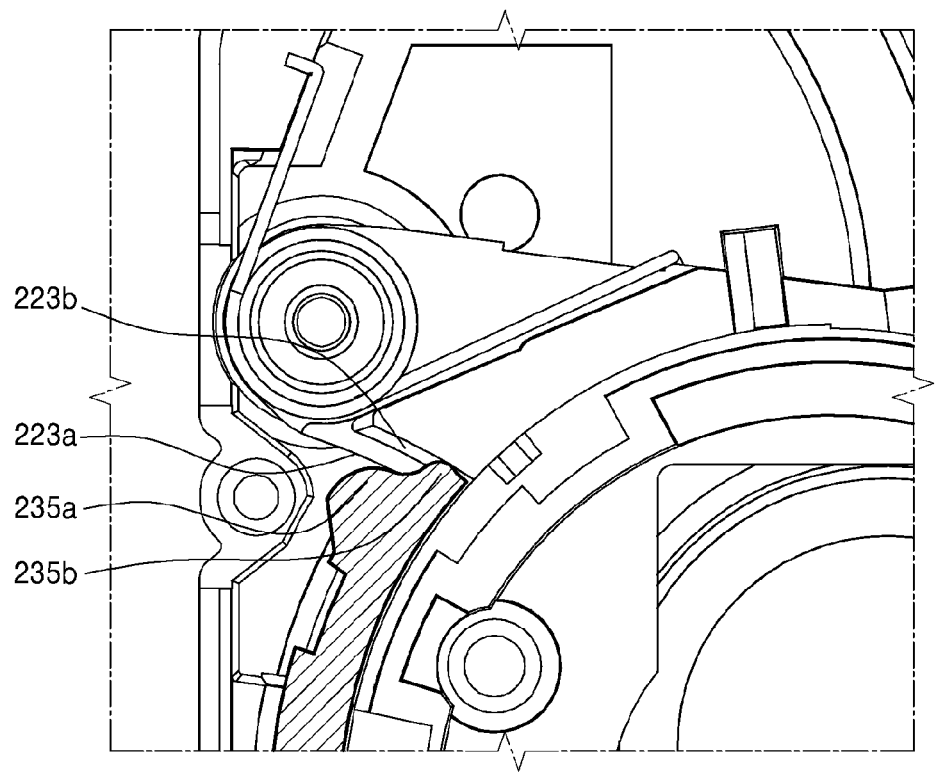
FIG. 10 is an enlarged, partial front view of the lens driving assembly of the electronic apparatus of FIG. 1 in which both a first protrusion and a second protrusion of the cam barrel contact the first lens group assembly.

FIG. 10 is an enlarged front view of the lens driving assembly 200 of the electronic apparatus 100 of FIG. 1 in which both the first protrusion 235a and the second protrusion 235b of the cam barrel 230 contact the first lens group assembly 220.

Figure 11:
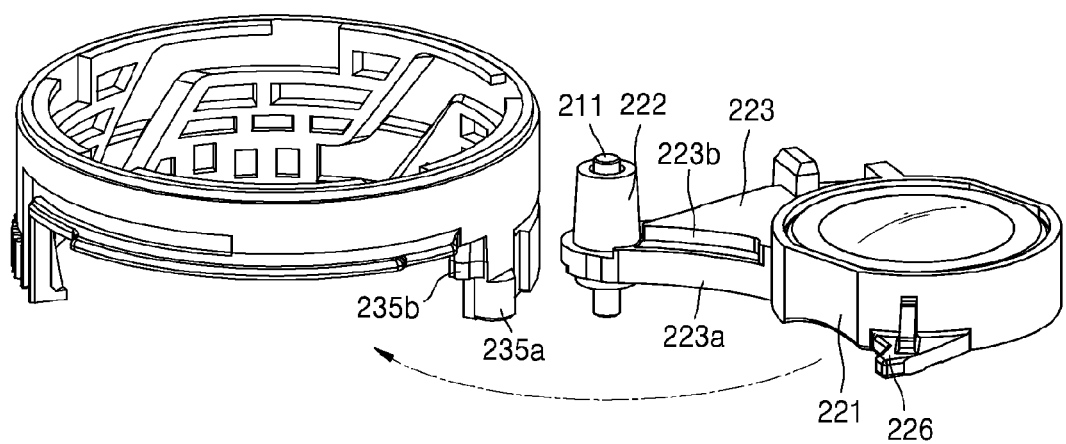
FIG. 11 is a perspective view schematically illustrating that the first lens group assembly and the cam barrel are separated from each other in the electronic apparatus of FIG. 1.

FIG. 11 is a perspective view schematically illustrating that the first lens group assembly 220 and the cam barrel 230 are separated from each other in the electronic apparatus 100 of FIG. 1.

Referring to FIGS. 10 and 11, both the first protrusion 235a and the second protrusion 235b may contact the side surface of the connection arm 223 of the first lens group assembly 220. For example, the first protrusion 235a may contact the first side surface 223a of the connection arm 223, whereas the second protrusion 235b may contact a second side surface 223b of the connection arm 223. When the cam barrel 230 continuously rotates, the side surface of the connection arm 223 of the first lens group assembly 220 may contact, in a sequential order, only the first protrusion 235a, for example, at the angle $\theta_1$, both the first protrusion 235a and the second protrusion 235b, for example, at the angle $\theta_2$, only the second protrusion 235b, and none of the first protrusion 235a and the second protrusion 235b.

The second protrusion 235b of the cam barrel 230 protrudes further in a circumferential direction compared to the first protrusion 235a. The first protrusion 235 protrudes further in a radial direction compared to the second protrusion 235b. Also, the second protrusion 235b of the cam barrel 230 may be located in an upper side compared to the first protrusion 235a that is close to the lens base 210. The second protrusion 235b may be located to be further separated from the lens base 210 in the optical axis direction (+z direction), compared to the first protrusion 235a.

In the side surface of the connection arm 223 of the first lens group assembly 220, the second side surface 223b is grooved further inwardly into the connection arm 223, compared to the first side surface 223a. The second side surface 223b may be formed to be stepped inwardly from the first side surface 223a into the connection arm 223. Accordingly, the first protrusion 235a that protrudes further in the radial direction of the cam barrel 230 may first contact the side surface, for example, the first side surface 223a, of the connection arm 223, compared to the second protrusion 235b.

Since the second protrusion 235b protrudes further in the circumferential direction compared to the first protrusion 235a, a contact position of the first lens group assembly 220 with the second side surface 223b is far from the rotation center of the first lens group assembly 220. Accordingly, when the first lens group assembly 220 is moved toward the alignment position by the elastic force of the spring 219, a force applied from the first lens group assembly 220 to the second protrusion 235b may be decreased. Conversely, when the second protrusion 235b pushes the second side surface 223b of the first lens group assembly 220 to return to the home position, a pushing force may be decreased. Accordingly, a rotation load of the cam barrel 230 may be reduced. Also, the rotation speed of the first lens group assembly 220 before the contact by both the first protrusion 235a and the second protrusion 235b may be faster than the rotation speed of the first lens group assembly 220 after the contact by both the first protrusion 235a and the second protrusion 235b. The first lens group assembly 220 whose rotation speed is reduced by the contact of the second protrusion 235b and the second side surface 223b may reduce contact shock, vibration, and/or noise at the alignment position.

Referring to FIG. 8B, when the first lens group assembly 220 and the first protrusion 235a and the second protrusion 235b contact one another altogether, an angle $\theta_3$ of the first protrusion 235a is about 57.2°, for example, an angle between about 54° to 60°. An angle $\alpha_3$ of the second protrusion 235b is about 47.6°, for example, an angle between about 44° to 50°.

It will be apparent to those of ordinary skill in the art that the angles $\theta_3$ and $\alpha_3$ may vary according to at least one of a radius of curvature of the side surface, for example, the first side surface 223a and the second side surface 223b, of the connection arm 223 of the first lens group assembly 220 that contacts the first protrusion 235a and the second protrusion 235b, the position of the axis 211 of the lens base 210, and the angle of the opening 232 of the cam barrel 230, for example, an angle between the start position and the end position of the opening 232.

Figure 9A:
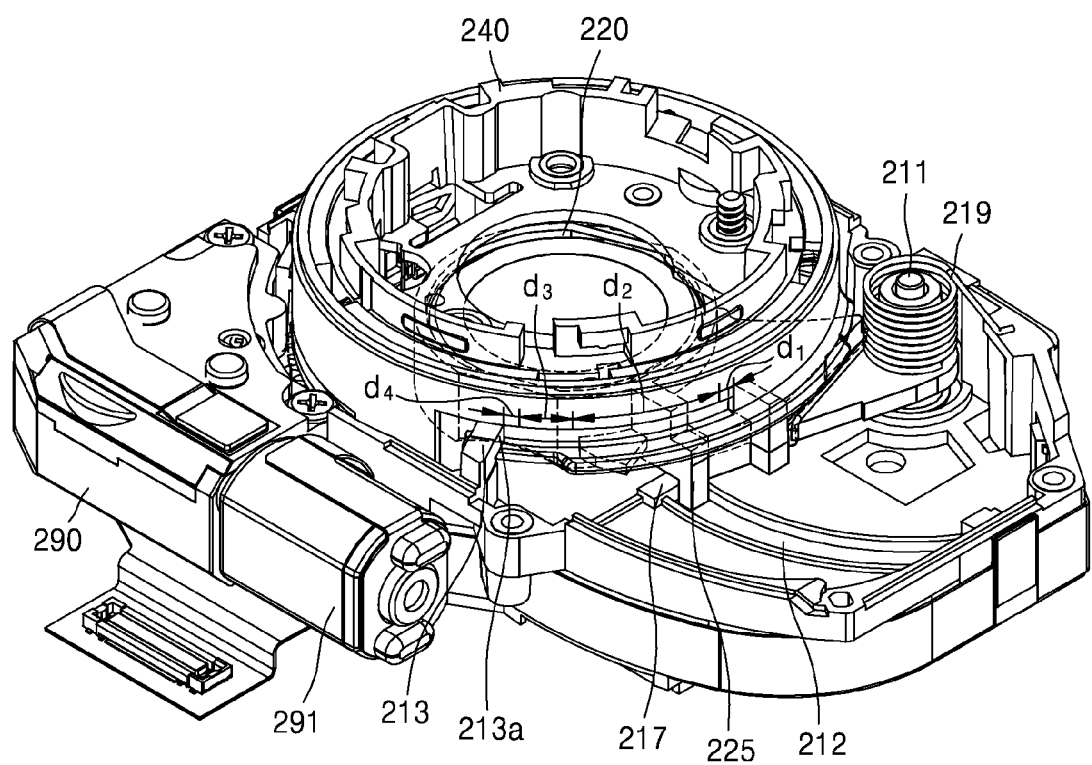
FIGS. 9A and 9B respectively are a perspective view and a front view schematically illustrating the lens driving assembly of the electronic apparatus of FIG. 1 in which the first lens group assembly is located at the alignment position.
Figure 9B:
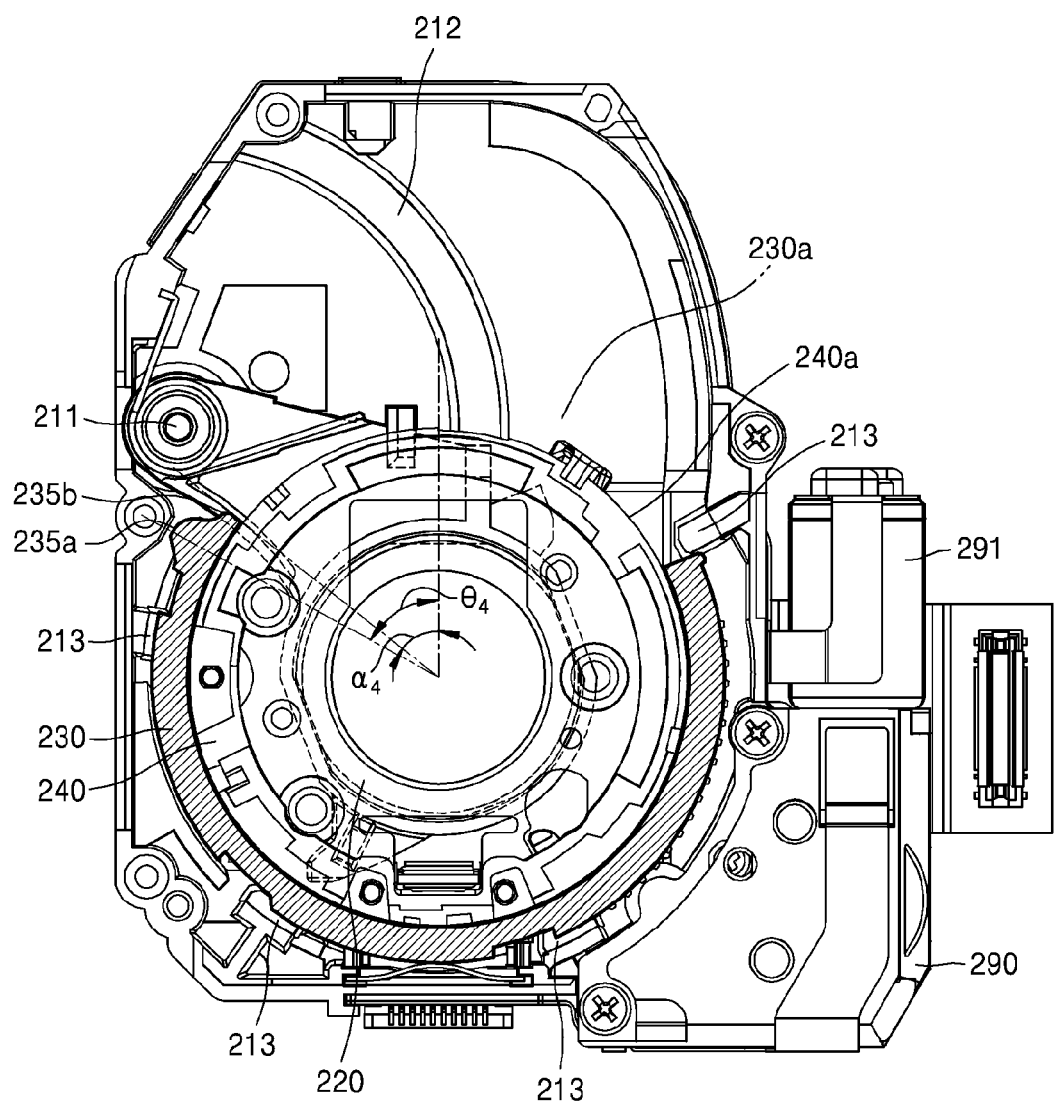

FIGS. 9A and 9B respectively are a perspective view and a front view schematically illustrating the lens driving assembly 200 of the electronic apparatus 100 of FIG. 1 in which the first lens group assembly 220 is located at the alignment position.

Referring to FIGS. 9A and 9B, the first lens group assembly 220 is aligned with the alignment position by the elastic force.

The position of the front barrel 240 may be the second position of the front barrel 240. Each of the protrusions 241 of the front barrel 240 may be located in the upper end area 231n of each of the first guide grooves 231. Also, each of the protrusions 241 of the front barrel 240 may horizontally move over the upper end area 231n of each of the first guide grooves 231.

The fixed protrusions 213 of the lens base 210 are located in the second guide grooves 233 of the cam barrel 230. As the cam barrel 230 rotates, one end of the opposite ends of each of the second guide grooves 233 may be separated by a distance, that is, d1+d2+d3+d4=12.22 mm, from the one side surface 213a of each of the fixed protrusions 213 of the lens base 210. Also, the distance d1+d2+d3+d4 may be, for example, about 9.22 to 15.22 mm.

The first lens group assembly 220 is aligned with the optical axis direction based on the axis 211 by the second stopper (not shown) of the lens base 210 and a first lens group stopper 226. The second stopper of the lens base 210 is formed on the lens base 210. The second stopper is located within the inner diameter of the cam barrel 230 and may contact the first lens group stopper 226. In this case, the first lens group assembly 220, the second lens group barrel 250, and the image sensor 291 may be aligned with the optical axis direction.

When the first lens group assembly 220 is aligned with the optical axis direction, that is, arrives at the second position, the first lens group guide protrusion 225 and the first stopper 216 of the first lens group assembly 220 are separated from each other. The first lens group guide protrusion 225 may restrict vibration of the first lens group assembly 220 in the optical axis direction (z axis direction).

When the first lens group assembly 220 is aligned with the optical axis direction, that is, arrives at the second position, both the first protrusion 235a and the second protrusion 235b do not contact the first and second side surfaces 223a and 223b of the connection arm 223 of the first lens group assembly 220. The first lens group assembly 220 is restricted by the elastic force from returning from the alignment position to the home position. The electronic apparatus 100 may capture a still image and/or a moving image by using the first lens group assembly 220, the second lens group barrel 250 and the shutter assembly 260 aligned with the optical axis direction at the alignment position according to a user input (or voice or motion) including touching the shutter button 103 or the display screen.

When the first lens group assembly 220 is aligned with the optical axis direction, that is, it arrives at the second position, an angle $\theta_4$ of the first protrusion 235a may be about 61.4°, for example, an angle between about 57° to 64°. An angle $\alpha_4$ of the second protrusion 235b may be about 50.8°, for example, an angle between about 48° to 54°.

When the first lens group assembly 220 is moved from the alignment position to the home position corresponding to the rotation of the cam barrel 230 in a clockwise direction, the processes of FIGS. 6A to 9A may be performed in a reverse order. For example, the side surface of the connection arm 223 of the first lens group assembly 220 may contact, in a sequential order, none of the first protrusion 235a and the second protrusion 235b, only the second protrusion 235b, both the first protrusion 235a and the second protrusion 235b, and only the first protrusion 235a.

When the first lens group assembly 220 is moved from the alignment position to the home position, the second protrusion 235b and the second side surface 223b first contact each other. Since the second protrusion 235b protrudes further in the circumferential direction compared to the first protrusion 235a, a contact position of the second protrusion 235b and the second side surface 223b may be far from the rotation center of the first lens group assembly 220. Accordingly, a rotation load of the cam barrel 230 to rotate the first lens group assembly 220 may be reduced. Also, by decreasing the movement speed of the first lens group assembly 220, vibration and noise may be reduced at the first contact position of the second protrusion 235b and the second side surface 223b.

Figure 12A:
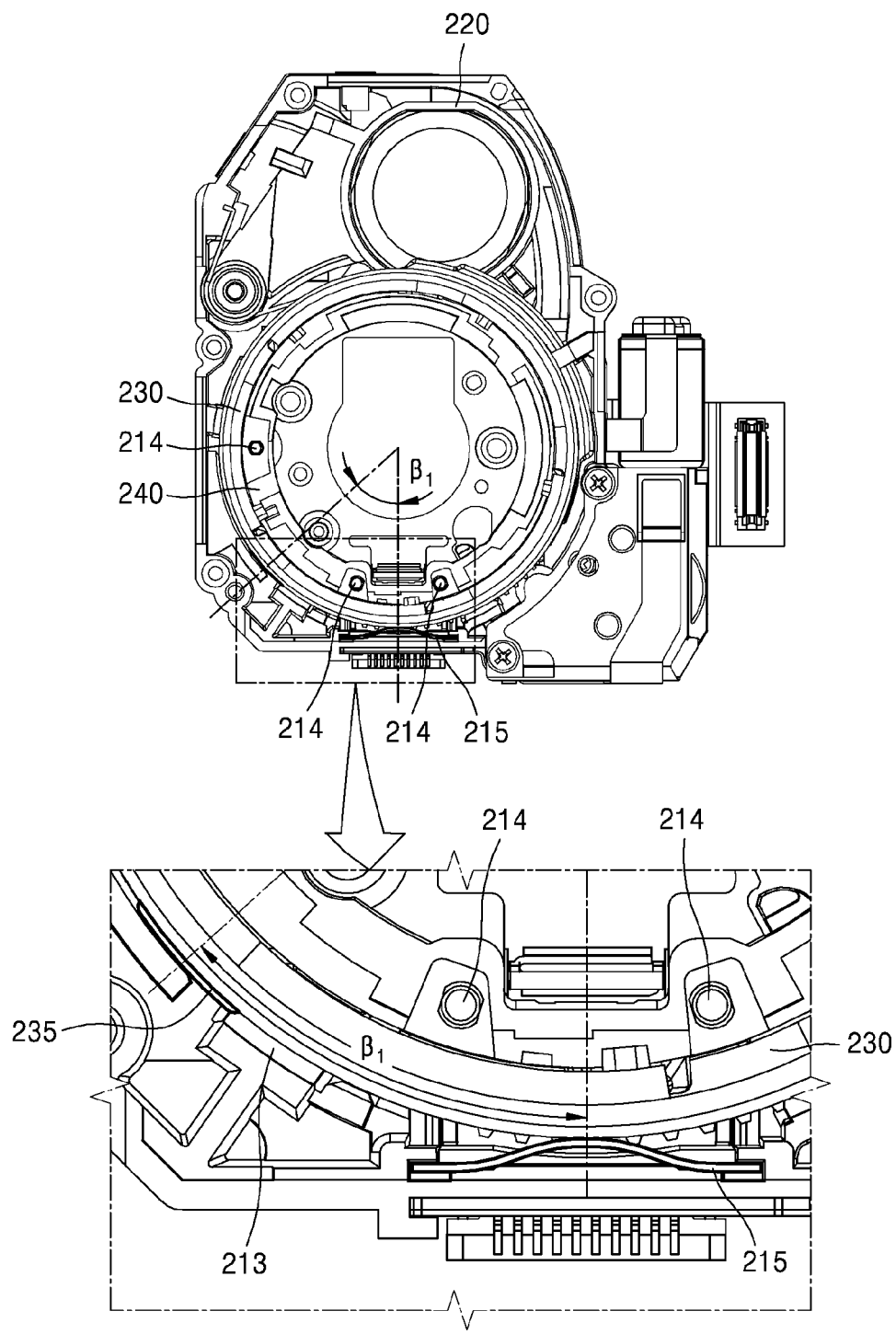
FIGS. 12A and 12B are perspective views schematically illustrating respective cases in which the cam barrel contacts and is separated from a leaf spring in the electronic apparatus of FIG. 1.
Figure 12B:
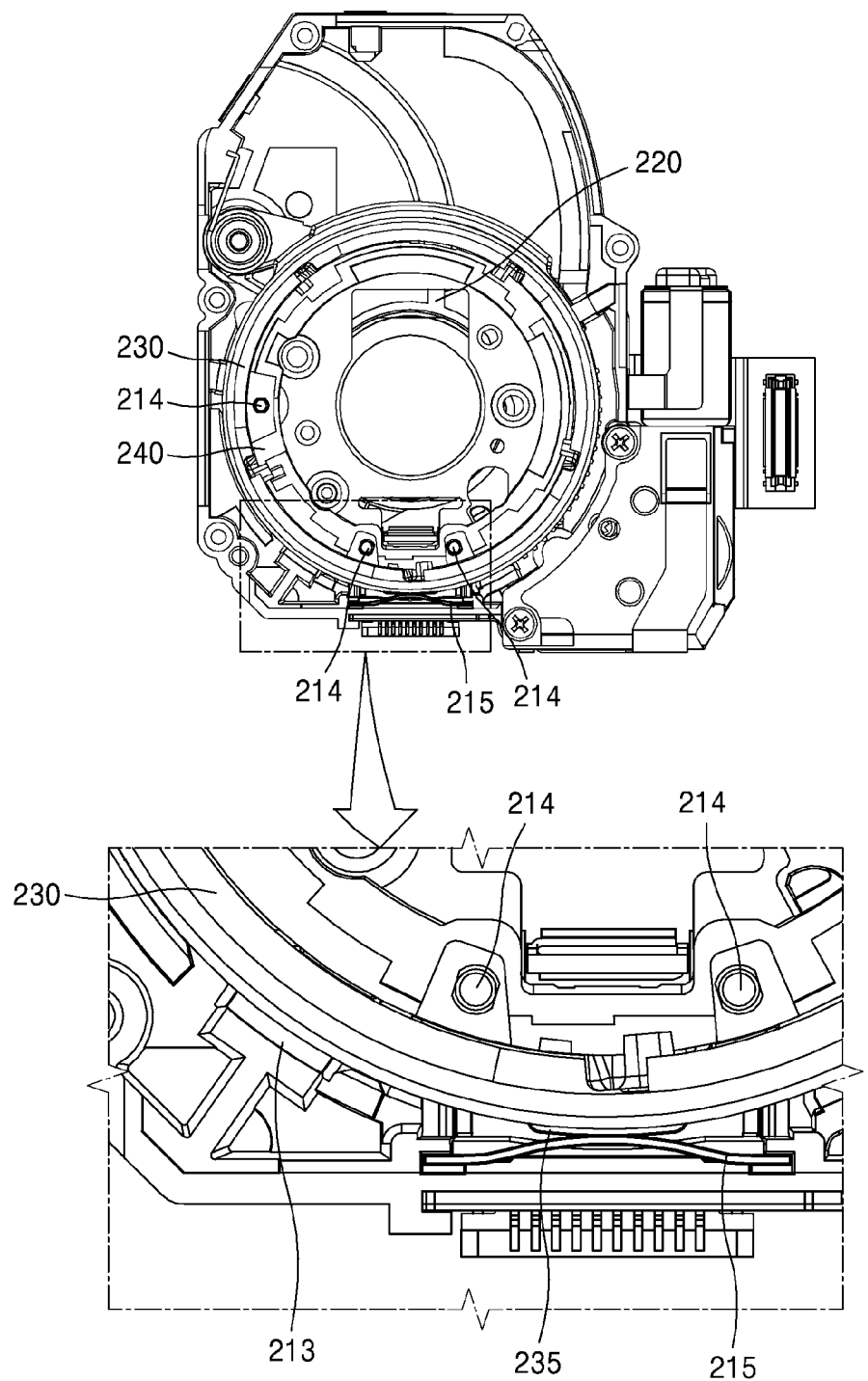

FIGS. 12A and 12B are perspective views schematically illustrating respective cases in which the cam barrel 230 contacts and is separated from a leaf spring in the electronic apparatus of FIG. 1.

Referring to FIG. 12A, when the first lens group assembly 220 is located at the home position, the leaf spring 215 may contact or may not contact the cam barrel 230 according to the rotation of the cam barrel 230. Even when the leaf spring 215 contacts the cam barrel 230 by the rotation of the cam barrel 230, a load of the leaf spring 215 is not great. Referring to FIG. 12B, when the first lens group assembly 220 is located at the alignment position, the cam barrel 230 and the leaf spring 215 contact each other via a circumferential protrusion 235. A center area of the leaf spring 215 protrudes toward the cam barrel 230, for example, in a radial direction of the cam barrel 230.

When the first lens group assembly 220 is at the home position, an angle $\beta_1$ between the circumferential protrusion 235 of the cam barrel 230 and the leaf spring 215 is about 47°. For example, the angle between the circumferential protrusion 235 of the cam barrel 230 and the leaf spring 215 may be between about 44° to 50°.

The circumferential protrusion 235 protrudes in the radial direction of the cam barrel 230, for example, in a direction facing the center area of the leaf spring 215, and may contact the center area of the leaf spring 215. The protruding height of the circumferential protrusion 235 may be about 0.5 mm, for example, between 0.10 to 1.0 mm.

It will be apparent to those of ordinary skill in the art that the protrusion height of the circumferential protrusion 235 may vary according to the structure of the lens driving assembly 200.

When the cam barrel 230 rotates, the front barrel 240 has a linear motion in the optical axis direction (z axis direction) due to the guide bars 214. Vibration may be generated due to at least one of contact between the protrusions 241 of the front barrel 240 and the cam barrel 230 and contact between the front barrel 240 and the guide bars 214. Also, noise may be generated. When the first lens group assembly 220 and the second lens group barrel 250 are aligned with the optical axis direction, optical quality, for example, optical performance, may be changed due to the vibration. When the cam barrel 230 rotates, the cam barrel 230 is rotated by the driving force of the motor 291 so as to contact the leaf spring 215. While the cam barrel 230 rotates, the cam barrel 230 may not contact the leaf spring 215.

When the first lens group assembly 220 is aligned at the alignment position, the circumferential protrusion 235 of the cam barrel 230 contacts the leaf spring 215. As the cam barrel 230 rotates, the circumferential protrusion 235 first contacts an edge of the leaf spring 215, then the center area of the circumferential protrusion 235 contacts the center area of the leaf spring 215. When the cam barrel 230 stops rotating, the center area of the circumferential protrusion 235 and the center area of the leaf spring 215 each other may be in a contacted state. The vibration of the cam barrel 230 may be reduced by the contact between the circumferential protrusion 235 and the leaf spring 215. When the circumferential protrusion 235 and the leaf spring 215 contact each other, a moving gap between the cam barrel 230 and the leaf spring 215 may be reduced by the height of the circumferential protrusion 235 and/or the elastic force of the leaf spring 215. The vibration may be reduced by the contact between the circumferential protrusion 235 and the leaf spring 215, in a section for optical performance, for example, a section in which the first lens group assembly 220 and the second lens group barrel 250 are aligned in the optical axis direction. A user may capture a desired still image and/or moving image due to the vibration reduced in the section needing optical performance.

In another embodiment, the cam barrel 230 may have a separate circumferential protrusion (not shown) corresponding to the first lens group assembly 220 located at the home position. When the first lens group assembly 220 is located at the home position, the separate circumferential protrusion of the cam barrel 230 may be located to face the leaf spring 215 as illustrated in FIG. 12A. As illustrated in FIG. 12B, the separate circumferential protrusion and the leaf spring 215 may contact each other.

In another embodiment, the electronic apparatus 100 may attenuate vibration by using not only an elastic member such as the leaf spring 215 but also another vibration attenuation member (not shown), for example, made of rubber or plastic.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

What is claimed is:

1. A lens driving assembly comprising:
   a cam barrel having an opening in an outer circumferential surface thereof and that rotates around an optical axis;
   a front barrel accommodated in the cam barrel and that moves in an optical axis direction corresponding to rotation of the cam barrel; and
   a first lens group assembly that pivots between a home position that is deviated from the optical axis and an alignment position that is aligned with the optical axis,
   wherein the cam barrel comprises at least one protrusion that guides a movement of the first lens group assembly;
   wherein the first lens group assembly moves through the opening between the home position and the alignment position according to the rotation of the cambarrel and an elastic force.

2. The lens driving assembly of claim 1, wherein the cam barrel comprises:
   a gear formed on the outer circumferential surface of the cam barrel and that receives the driving force from a driving module; and
   a first guide groove formed in an inner circumferential surface of the cam barrel and that guides the front barrel corresponding to the rotation due to the driving force.

3. The lens driving assembly of claim 2, wherein the at least one protrusion of the cam barrel comprises a plurality of protrusions, and the plurality of protrusions selectively contact a side surface of the first lens group assembly that rotates, corresponding to the rotation of the cam barrel.

4. The lens driving assembly of claim 2, wherein the gear is formed at an angle larger than a rotational angle of the cam barrel.

5. The lens driving assembly of claim 2, wherein the first guide groove comprises a short first guide groove having a short length and a long first guide groove having a long length due to the opening.

6. The lens driving assembly of claim 2, wherein, when the front barrel is moved by the rotation of the cam barrel, the first lens group assembly is moved through the opening into an inner space by the movement of the front barrel.

7. The lens driving assembly of claim 2, wherein the front barrel comprises a plurality of protrusions that are formed on an outer circumferential surface of the front barrel and guided by the first guide groove of the cam barrel, and a second lens group barrel is accommodated in the front barrel.

8. The lens driving assembly of claim 1, wherein the home position is a position of the first lens group assembly in an electronic apparatus that is in a first state, and the alignment position is a position of the first lens group assembly in the electronic apparatus that is in a second state.

9. The lens driving assembly of claim 2, wherein a movement of the first lens group assembly is restricted by contact between the at least one protrusion of the cam barrel and a side surface of the first lens group assembly in a partial rotation section of an entire rotation section of the cam barrel.

10. The lens driving assembly of claim 3, wherein the first lens group assembly comprises a first side surface and a second side surface corresponding to contacts of a plurality of protrusions of the cam barrel, and at least one of the plurality of protrusions is contacted to the first side surface and the second side surface.

11. The lens driving assembly of claim 1, wherein a rotation angle of the cam barrel while the first lens group assembly is located at the home position is larger than a rotation angle of the cam barrel while the first lens group assembly is moved from the home position to the alignment position.

12. The lens driving assembly of claim 1, further comprising a lens base that accommodates the cam barrel, wherein the lens base comprises:
    an axis that is a center of rotation of the first lens group assembly;
    a lens base guide groove that guides a rotation of the first lens group assembly;
    a fixing protrusion inserted in a second guide groove that is formed in the outer circumferential surface of the cam barrel and that guides the rotation of the cam barrel; and
    a guide bar that guides a linear motion of the front barrel corresponding to the rotation of the cam barrel.

13. The lens driving assembly of claim 12, wherein the lens base guide groove of the lens base has a radius of curvature.

14. The lens driving assembly of claim 12, wherein the lens base further comprises an image sensor opening, and an image sensor is aligned with the optical axis through the image sensor opening.

15. The lens driving assembly of claim 12, wherein the lens base further comprises a leaf spring, and when the first lens group assembly arrives at the alignment position, the leaf spring contacts a circumferential protrusion that is formed on the outer circumferential surface of the cam barrel so as to attenuate a generated vibration corresponding to the arrival of the first lens group assembly at the alignment position.

16. The lens driving assembly of claim 1, further comprising a spring that provides the first lens group assembly with the elastic force in a direction to pivot the first lens group assembly to the alignment position, wherein the spring comprises a hook at least one end of opposite ends of the spring.

17. A lens driving assembly comprising:
    a cam barrel having a plurality of protrusions and an opening in an outer circumferential surface thereof and that rotates around an optical axis;
    a front barrel accommodated in the cam barrel and having a linear motion in an optical axis direction corresponding to the rotation of the cam barrel; and
    a first lens group assembly that pivots between a home position that is deviated from the optical axis and an alignment position that is aligned with the optical axis,
    wherein the first lens group assembly moves through the opening between the home position and the alignment position according to the rotation of the cam barrel and an elastic force, and
    one of the plurality of protrusions protrudes in a circumferential direction of the cam barrel and another of the plurality of protrusions protrudes in a radial direction of the cam barrel so as to selectively contact the first lens group assembly corresponding to the rotation of the cam barrel.

18. An electronic apparatus comprising:
    a lens driving assembly having a motor; and
    a control unit controlling driving of the motor,
    wherein the lens driving assembly further comprises:
    a cam barrel having an opening and that rotates around an optical axis due to a driving force that is transferred from the motor;

a front barrel accommodated in the cam barrel and that moves in an optical axis direction corresponding to the rotation of the cam barrel; and a first lens group assembly that pivots between a home position that is deviated from the optical axis and an alignment position that is aligned with the optical axis, wherein the cam barrel comprises at least one protrusion that guides a movement of the first group assembly;

wherein the first lens group assembly moves through the opening between the home position and the alignment position according to the rotation of the cam barrel and an elastic force.

\* \* \* \* \*

UNITED STATES PATENT AND TRADEMARK OFFICE
CERTIFICATE OF CORRECTION

PATENT NO. : 9,491,343 B2
APPLICATION NO. : 14/592302
DATED : November 8, 2016
INVENTOR(S) : Yoon-seok Kang et al.

Page 1 of 1

It is certified that error appears in the above-identified patent and that said Letters Patent is hereby corrected as shown below:

In the Claims

In Claim 1, Column 23, Line 17, replace "according to the rotation of the cambarrel" with --according to the rotation of the cam barrel--

In Claim 16, Column 24, Lines 38-39, replace "wherein the spring comprises a hook at least one end of opposite ends" with --wherein the spring comprises a hook at at least one end of opposite ends--

In Claim 18, Column 25, Lines 9-10, replace "a movement of the first group assembly" with --a movement of the first lens group assembly--

Signed and Sealed this
Third Day of January, 2017

Michelle K. Lee
*Director of the United States Patent and Trademark Office*